United States Patent
Sangu

(10) Patent No.: US 9,766,442 B2
(45) Date of Patent: Sep. 19, 2017

(54) CONFOCAL SCANNER AND CONFOCAL MICROSCOPE

(71) Applicant: YOKOGAWA ELECTRIC CORPORATION, Musashino-shi, Tokyo (JP)

(72) Inventor: Hiroyuki Sangu, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 31 days.

(21) Appl. No.: 14/960,822

(22) Filed: Dec. 7, 2015

(65) Prior Publication Data

US 2016/0161728 A1 Jun. 9, 2016

(30) Foreign Application Priority Data

Dec. 8, 2014 (JP) .................. 2014-247673
May 21, 2015 (JP) .................. 2015-103644

(51) Int. Cl.
*G02B 21/06* (2006.01)
*G02B 21/00* (2006.01)
(Continued)

(52) U.S. Cl.
CPC ....... *G02B 21/0044* (2013.01); *G02B 3/0056* (2013.01); *G02B 21/008* (2013.01);
(Continued)

(58) Field of Classification Search
CPC ............ G02B 21/0044; G02B 21/0032; G02B 21/0072; G02B 21/008; G02B 3/0056; G02B 27/58; G02B 27/144
(Continued)

(56) References Cited

U.S. PATENT DOCUMENTS

| 2005/0094261 A1 | 5/2005 | Hell et al. |
| 2015/0234178 A1* | 8/2015 | Azuma .............. G02B 26/0875 359/201.2 |
| 2015/0378141 A1 | 12/2015 | Bathe et al. |

FOREIGN PATENT DOCUMENTS

| DE | 102013001238 A1 | 7/2014 |
| EP | 1359452 A1 | 11/2003 |

(Continued)

OTHER PUBLICATIONS

Extended European Search Report dated Apr. 14, 2016, by the European Patent Office in counterpart European Application No. 15198248.5.

(Continued)

*Primary Examiner* — James Phan
(74) *Attorney, Agent, or Firm* — Sughrue Mion, PLLC

(57) ABSTRACT

A confocal scanner includes a first micro lens disk having a plurality of micro lenses arranged thereon, a second micro lens disk having a plurality of micro lenses, which is arranged in correspondence to an arrangement pattern of the first micro lens disk, and having a common rotation axis to the first micro lens disk, and a beam splitter configured to guide an illumination light, which is to be irradiated to an object, to the first micro lens disk, and to guide a return light from the object having passed through each micro lens of the first micro lens disk to the corresponding micro lens of the second micro lens disk. A numerical aperture of each micro lens arranged on the second micro lens disk is greater than a numerical aperture of each micro lens arranged on the first micro lens disk.

11 Claims, 19 Drawing Sheets

(51) Int. Cl.
    *G02B 3/00*     (2006.01)
    *G02B 27/14*    (2006.01)
    *G02B 27/58*    (2006.01)
(52) U.S. Cl.
    CPC ..... *G02B 21/0032* (2013.01); *G02B 21/0072* (2013.01); *G02B 27/144* (2013.01); *G02B 27/58* (2013.01)
(58) Field of Classification Search
    USPC .. 359/201.1, 203.1, 368, 381, 389, 621–622
    See application file for complete search history.

(56) References Cited

FOREIGN PATENT DOCUMENTS

| | | |
|---|---|---|
| EP | 2871511 A1 | 5/2015 |
| EP | 2908166 A2 | 8/2015 |
| JP | 926545 A | 1/1997 |
| JP | 9230245 A | 9/1997 |
| JP | 10-62691 A | 3/1998 |
| JP | 2010066575 A | 3/2010 |
| JP | 2012-78408 A | 4/2012 |
| WO | 03093892 A1 | 11/2003 |
| WO | 2013/126762 A1 | 8/2013 |

OTHER PUBLICATIONS

Schulz, O. et al., "Resolution doubling in fluorescence microscopy with confocal spinning-disk image scanning microscopy", Proceedings of National Academy of Sciences, Dec. 24, 2013, 15 pages total, vol. 110, No. 52, USA.

* cited by examiner

CONFOCAL SCANNER AND CONFOCAL MICROSCOPE

CROSS-REFERENCE TO RELATED APPLICATION

The present application claims priorities from Japanese Patent Applications No. 2014-247673 filed on Dec. 8, 2014 and No. 2015-103644 filed on May 21, 2015, the entire contents of which are incorporated herein by reference.

BACKGROUND

Technical Field

The present disclosure relates to a confocal scanner configured to obtain a super resolution by optical processing, and more particularly, to a confocal scanner capable of reducing complication of a positioning operation of an optical component and a confocal microscope using the confocal scanner.

Related Art

A confocal microscope configured to irradiate a light to an object with pinpoint, to selectively detect only a focusing light from an irradiation point, to scan the irradiation point and to obtain an image is an optical microscope capable of reconstructing an image of a high resolution and three-dimensional information. The confocal microscope is widely used in the biological science field and the like, and a variety of related technologies have been suggested.

For example, Patent Document 1 discloses a confocal scanner, which is a scan unit of a confocal microscope, includes a micro lens disk having a plurality of micro lenses and a pinhole disk having pinholes formed in the same pattern as the micro lenses, and is configured to perform a multi-beam scanning by rotating the disks while irradiating an illumination light.

In the related art, an optical microscope including the confocal microscope has an Abbe's diffraction limit, i.e., a resolution limit based on a theory that an object smaller than a half wavelength of the light to be irradiated to the object cannot be seen. In recent years, a super resolution technology of obtaining an image having a resolution beyond the resolution limit has been developed and put to practical use.

For example, Patent Document 2 discloses a technology of using a scan mask, which is configured to modulate spatial intensity distributions of an excitation light from a light source and a return light from an object, to capture an image having a high frequency component beyond a resolution limit, and performing high frequency enhancement processing to obtain a super resolution. Also, Non-Patent Document 1 discloses a technology of using a shutter, which is configured to pass an illumination light from a light source apparatus in a strobe shape, to capture hundreds of images having a plurality of bright spots recorded therein while slightly changing positions of the bright spots, performing image processing in which the bright spot becomes a half size for each image, and synthesizing the respective images to obtain a super resolution image.

According to the super resolution technologies disclosed in Patent Document 2 and Non-Patent Document 1, since the complicated or the large amount of image processing is performed, the calculation load is high and much time is consumed for the processing. That is, the corresponding super resolution technologies are inappropriate to the real-time observation.

In contrast, Patent Document 3 discloses a technology capable of obtaining a super resolution image at high speed by optical processing. FIG. 19 shows a configuration of an optical system of a microscope system disclosed in Patent Document 3.

As shown in FIG. 19, a microscope system 400 is configured to irradiate a laser light, which is to be emitted from a light source 410, to a sample 430, and to capture a return light with a camera 420. The collimated illumination light emitted from the light source 410 is divided into a plurality of illumination light beamlets by a micro lens array 411. The illumination light beamlets are reflected on a galvanometer mirror 413, and are concentrated on the sample 430 by an objective lens 414.

The sample 430 is configured to radiate the return light based on the illumination light. In particular, in case of fluorescent sample observation, the sample 430 is a specific structure dyed by a fluorescent dye and the like, and is configured so that fluorescent dye molecules are excited by the illumination light and radiate the fluorescence having a longer wavelength than the illumination light.

The return light from the sample 430 is reflected on the galvanometer mirror 413, is reflected on a beam splitter 412 and then passes through a lens 415. The return light having passed through the lens 415 reaches a pinhole array 416 having a plurality of pinholes. However, only the light from a focal plane of the sample 430 is focused on the pinhole array 416 and passes through the pinholes.

The return light having passed through the pinhole passes through a micro lens array 417 and a micro lens array 418 each of which having a plurality of micro lenses, is reflected on the galvanometer mirror 413, and is captured by the camera 420. The return light is a part of the sample 430 on which the illumination light beamlets are reflected, but can scan the entire sample 430 by changing a direction of the galvanometer mirror 413.

Here, the pinhole array 416 is precisely arranged so that each pinhole is disposed at a position conjugate with a focusing spot of the objective lens 414. Also, each pinhole of the pinhole array 416 is precisely arranged at a focal position of each micro lens of the micro lens array 417. Further, each micro lens of the micro lens array 417 and each micro lens of the micro lens array 418 are precisely arranged to be coaxial with each other.

A focal length of each micro lens of the micro lens array 418 is set to be shorter than a focal length of each micro lens of the micro lens array 417.

In the above configuration, the return light of the focusing plane having passed through the pinholes of the pinhole array 416 is converted into a parallel light by the micro lens array 417, which is then incident to the micro lens array 418. Since the focal length of each micro lens of the micro lens array 418 is shorter than the focal length of each micro lens of the micro lens array 417, a numerical aperture of the return light increases when passing through the micro lens array 417. For example, when the focal length of each micro lens of the micro lens array 418 is a half of the focal length of each micro lens of the micro lens array 417, the return light is converted into a light beam having a double numerical aperture.

When the light beam is captured by the camera 420 while changing a direction of the galvanometer mirror 413, a super resolution image of the sample 430 can be obtained. At this time, since it is not necessary to perform the troublesome image processing and the plurality of capturing processing, it is possible to simply obtain the super resolution image at high speed.

[Patent Document 1] Japanese Patent Application Publication No. Hei 10-062691A

[Patent Document 2] Japanese Patent Application Publication No. 2012-78408A

[Patent Document 3] International Patent Application Publication No. WO2013/126762

[Non-Patent Document 1] Schulz, O. et al. Resolution doubling in fluorescence microscopy with confocal spinning-disk image scanning microscopy. Proceedings of the National Academy of Sciences of United States of America, Vol. 110, pp. 21000-21005 (2013)

As described above, it is possible to simply obtain the super resolution image at high speed by using the confocal scanner configured to obtain a super resolution with the optical processing. However, in case of the confocal scanner configured to obtain a super resolution image with the optical processing, it is necessary to perform the precise positioning with respect to each optical component of the micro lens array for the illumination light, the objective lens, the two micro lens arrays for the return light, and the pinhole array. According to the optical system disclosed in Patent Document 3, the optical components are independently arranged with being spatially spaced, so that the precise positioning is not easy.

The precise positioning of the optical component causes the cost increase and is easily influenced by environment and temporal changes, and the maintenance thereof is complicated. Therefore, it is preferably to reduce a burden on the precise positioning as much as possible.

SUMMARY

Exemplary embodiments of the invention provide a confocal scanner and a confocal microscope using the confocal scanner which can reduce a burden on a precise positioning in the confocal scanner configured to obtain a super resolution image with optical processing.

A confocal scanner according to an exemplary embodiment of the invention, comprises:

a first micro lens disk having a plurality of micro lenses arranged thereon;

a second micro lens disk having a plurality of micro lenses, which is arranged in correspondence to an arrangement pattern of the first micro lens disk, and having a common rotation axis to the first micro lens disk; and a beam splitter configured to guide an illumination light, which is to be irradiated to an object, to the first micro lens disk, and to guide a return light from the object having passed through each micro lens of the first micro lens disk to the corresponding micro lens of the second micro lens disk, wherein a numerical aperture of each micro lens arranged on the second micro lens disk is greater than a numerical aperture of each micro lens arranged on the first micro lens disk.

Pinholes may be arranged at respective focal positions of the respective micro lenses, which are arranged on the second micro lens disk, on a side opposite to the object.

Pinholes may be arranged at respective focal positions of the respective micro lenses, which are arranged on the first micro lens disk, on a side facing the object.

Micro lenses for image reversal corresponding to the respective pinholes may be arranged on the side facing the object.

Micro lenses for image reversal may be arranged at more distant positions than respective focal positions of the respective micro lenses, which are arranged on the first micro lens disk, on a side of the first micro lens disk facing the object, and pinholes are arranged at each focusing position of the illumination lights of the micro lenses for image reversal.

The micro lenses arranged on the second micro lens disk may be concave lenses.

The numerical aperture of each micro lens arranged on the second micro lens disk may be substantially twice as large as the numerical aperture of each micro lens arranged on the first micro lens disk.

A diameter of each micro lens arranged on the first micro lens disk may be smaller than a diameter of each micro lens arranged on the second micro lens disk.

The illumination light that is to be guided to the first micro lens disk by the beam splitter may obliquely advance relative to an optical axis of each micro lens on the first micro lens disk.

The illumination light that is to be guided to the first micro lens disk by the beam splitter may advance in parallel with an optical axis of each micro lens on the first micro lens disk, and the confocal scanner may comprise an optical member configured to correct an optical path shift, which is caused due to the beam splitter, and disposed between the first micro lens disk and the second micro lens disk.

A confocal microscope according to an exemplary embodiment comprises:

the confocal scanner;

a light source unit configured to emit an illumination light of a parallel light to the beam splitter;

an objective lens disposed at a first micro lens disk-side; and a capturing element arranged at a second micro lens disk-side.

The confocal microscope may comprise:

a first variable power optical system disposed between the first micro lens disk and the objective lens; and a second variable power optical system disposed between the second micro lens disk and the capturing element.

According to the present invention, it is possible to reduce the burden on the precise positioning in the confocal scanner configured to obtain the super resolution image with the optical processing.

DETAILED DESCRIPTION

First Exemplary Embodiment

Figure 1:
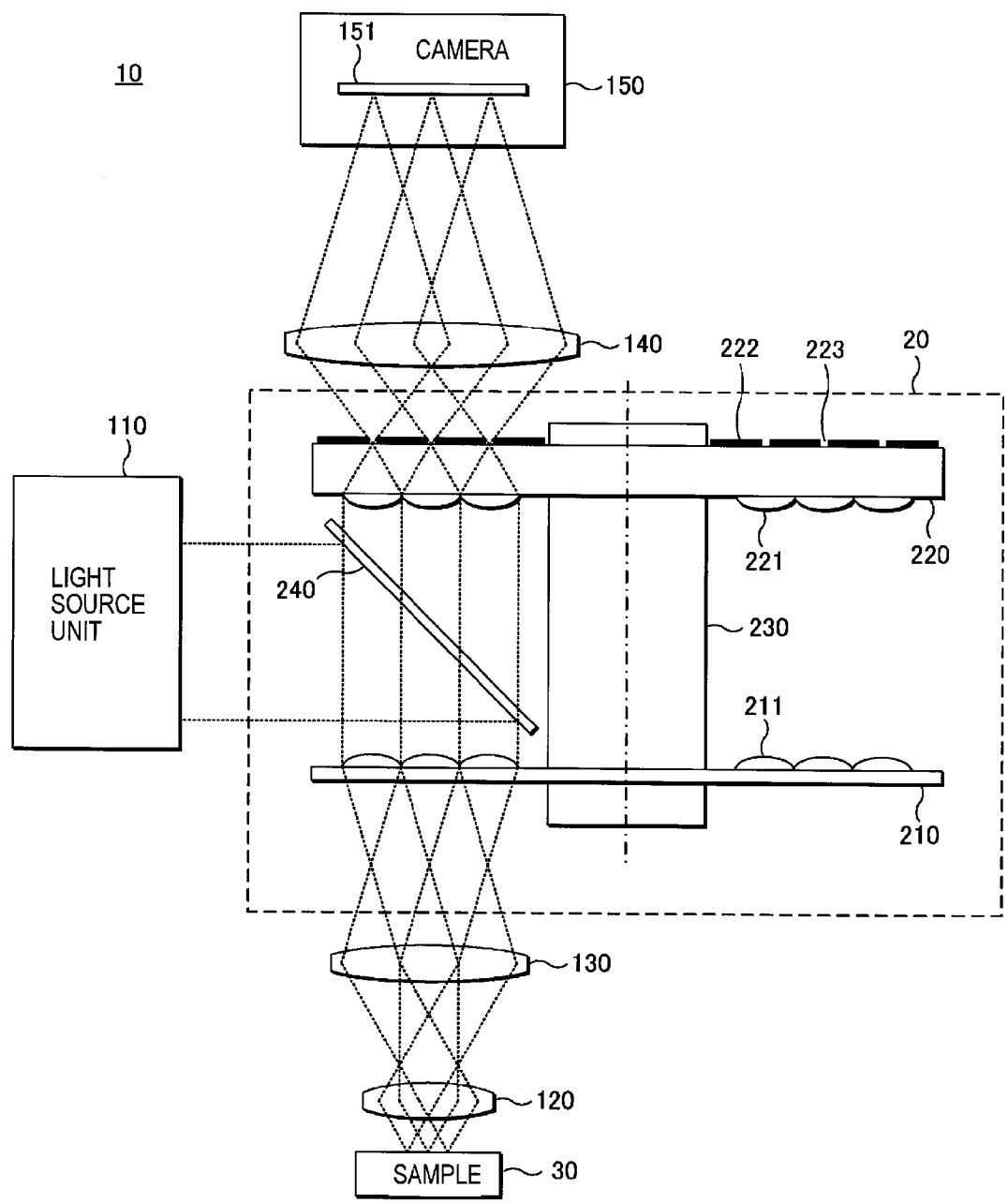
FIG. 1 pictorially shows a configuration of a confocal microscope using a confocal scanner of a first exemplary embodiment.

Exemplary embodiments of the present invention will be described with reference to the drawings. FIG. 1 pictorially shows a configuration of a confocal microscope 10 using a confocal scanner 20 of a first exemplary embodiment.

As shown in FIG. 1, the confocal microscope 10 using the confocal scanner 20 includes a light source unit 110 configured to emit a parallel light as an illumination light, an objective lens 120, a capturing lens 130, a relay lens 140, and a camera 150, and is configured to capture a super resolution confocal image of a sample 30.

The confocal scanner 20 includes a micro lens disk 210 having a plurality of micro lenses 211 regularly arranged thereon, a pinhole disk 220 having a plurality of micro lenses 221 arranged on one surface thereof and a plurality of pinholes 223 formed on the other surface, a motor 230 and a beam splitter 240. The micro lens disk 210 and the pinhole disk 220 having the micro lenses are arranged so that central axes thereof overlap with each other, and are configured to integrally rotate about the central axes by the motor 230.

The micro lens disk 210 and the pinhole disk 220 having the micro lenses are integrally formed, so that it is not necessary to mechanically adjust both the disks and it is possible to increase the stability with respect to the environmental and temporal changes.

The micro lenses 221 of the pinhole disk 220 are arranged on a side facing the micro lens disk 210, and a light shield mask 222 is provided on an opposite side. The respective micro lenses 221 of the pinhole disk 220 are arranged to be coaxial with the respective micro lenses 211 of the micro lens disk 210.

At least a part of the pinhole disk 220, on which the micro lenses 221 are arranged, is made of a material through which a return light penetrates, and a thickness of the pinhole disk 220 is set to a focal length of the micro lens 221.

The pinholes 223 are configured by fine apertures formed in the light shield mask 222, and each pinhole 223 is arranged at a focal position of each micro lens 221. A size of the pinhole 223 is preferably equivalent to a diffraction limit of the light to be concentrated at the micro lens 221.

In the exemplary embodiment, both the micro lens 211 and the micro lens 221 are convex lenses. However, the other optical elements such as a Fresnel lens and a diffraction optical element may also be adopted inasmuch as a lens effect can be accomplished. Also, a single lens or a compound lens may be adopted.

The beam splitter 240 is arranged between the micro lens disk 210 and the pinhole disk 220 having the micro lenses. The beam splitter 240 has characteristics of reflecting a wavelength of an illumination light and enabling the fluorescence having a long wavelength, which is generated from the sample 30 by the illumination light, to penetrate therethrough.

Figure 2:
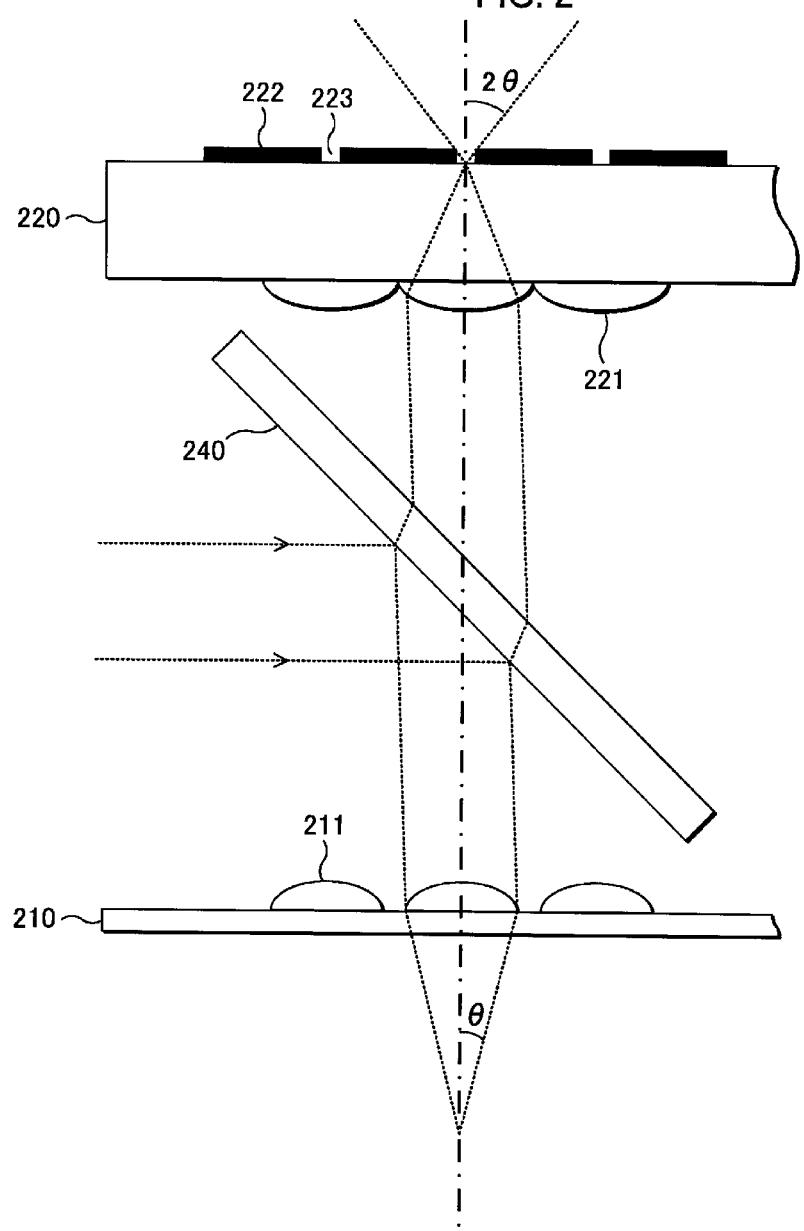
FIG. 2 shows in detail a positional relation among a micro lens disk, a pinhole disk having micro lenses and a beam splitter.

FIG. 2 shows in detail a positional relation among the micro lens disk 210, the pinhole disk 220 having the micro lenses and the beam splitter 240. In FIG. 2, the central axes of the micro lens 211 and the micro lens 221 of one set arranged on the same axis are denoted by the dashed-dotted line.

Since the beam splitter 240 has a thickness of a predetermined level, an optical path of the obliquely incident light is shifted by refraction. In this exemplary embodiment, in order to correct the optical path shift, an angle of the beam splitter 240 relative to the micro lens disk 210 is set to be slightly smaller than 45°. For this reason, the light reflected on the beam splitter 240 obliquely faces towards the micro lens disk 210 at a slight angle relative to the shown dashed-dotted line.

The light from the micro lens 211 also faces towards the beam splitter 240 along an optical path of a reverse direction of the same angle, and the beam splitter 240 is disposed at an angle at which the light refracted at the beam splitter 240 is correctly incident to the micro lens 221.

Here, an outer diameter of the micro lens 211 is formed to be slightly smaller than an outer diameter of the micro lens 221. In the meantime, as the method of correcting the optical path shift, the angle of the beam splitter 240 may be set to 45°, and the micro lens 211 and the micro lens 221 may be slightly inclined relative to the central axis. In this case, the light incident to the micro lens 211 from the beam splitter 240 is parallel with the optical axis shown with the dashed-dotted line.

In this exemplary embodiment, a numerical aperture (NA) of the light that is to be concentrated by the micro lens 221 is set to be twice as large as a numerical aperture of the light that is to be concentrated by the micro lens 211. That is, parameters of both the micro lenses are selected so that when an angle of the light to be concentrated at the micro lens 211 is denoted as $\theta$, an angle of the light to be concentrated at the micro lens 221 and to diverge from the pinhole 223 is $2\theta$. In the meantime, the resolution is highest at the double numerical aperture, in principle. However, the other multiples are also possible inasmuch as the numerical aperture of the light that is to be concentrated by the micro lens 221 is larger.

Here, when the angle relative to a center of the optical axis is denoted as $\phi$ and a refractive index of a medium is denoted as n, NA=n·sin ($\phi$). Also, although a diameter of the micro lens is largely shown for convenience of explanations in FIG. 2, an actual diameter of the micro lens is small, for example 1 mm or less. That is, the angels of $\theta$ and $2\theta$ are very small. When the angle is small, it can be assumed that sin ($\phi$)≈$\phi$. Therefore, it can be seen that the numerical aperture of the light that is to be concentrated by the micro lens 221 is substantially twice as large as the numerical aperture of the light that is to be concentrated by the micro lens 211.

Returning to FIG. 1, the capturing lens 130 and the objective lens 120 are arranged below the confocal scanner 20, and the sample 30 is arranged at a focal position of the objective lens 120. Also, the relay lens 140 is arranged above the confocal scanner 20, and is configured to project an image of a pinhole surface onto a surface of a capturing element 151 of the camera 150. In the meantime, a filter configured to pass only the desired fluorescence may be arranged on a front surface of the camera 150.

In the above configuration, the illumination light emitted from the light source unit 110 is reflected on the beam splitter 240 and is guided to the micro lens disk 210. Then, the light is divided into a plurality of illumination light beamlets by the plurality of micro lenses 211 on the micro lens disk 210. After each illumination light beamlet is once focused, it is converted into a parallel light at the capturing lens 130, and is concentrated at each point on the sample 30 by the objective lens 120.

The sample 30 is configured to radiate return lights based on the illumination light beamlets. In particular, in case of fluorescent sample observation, the sample 30 is a specific structure dyed by a fluorescent dye and the like, and is configured so that fluorescent dye molecules are excited by the illumination light and radiate the fluorescence having a longer wavelength than the illumination light.

Each return light captured by the objective lens 120 returns along the same optical path as the illumination light. That is, the return light is converted into the parallel light by the objective lens 120, is once focused by the capturing lens 130, is incident to the micro lens disk 210, and is then again converted into the parallel light by the micro lens 211. That is, the micro lens disk 210 serves as a micro lens disk for the illumination light and a micro lens disk for the return light. Thereby, it is possible to reduce the number of optical components for which the positioning is required.

Each return light passes through the beam splitter 240, and is incident to the micro lens 221 of the pinhole disk 220, as the parallel light. At this time, as shown in FIG. 2, the optical path shift due to the refraction at the beam splitter 240 is corrected by the angle adjustment of the beam splitter 240, for example.

The parallel light having passed through the beam splitter 240 is concentrated on the pinhole 223 by the micro lens 221. As described above, since the numerical aperture of the micro lens 221 is twice as large as the numerical aperture of the micro lens 211, a focus on the pinhole 223 is about a half of a focus formed by the beamlet in front of the micro lens 211, and the light passes through the pinhole 223.

At this time, only the return light from the sample-side focusing plane of the objective lens 120 passes through the pinhole 223. On the other hand, since the return light from a plane except for the focusing plane does not form a focus on the pinhole 223, it is shielded by the light shield mask 222 and cannot thus pass through the pinhole 223.

Figure 3:
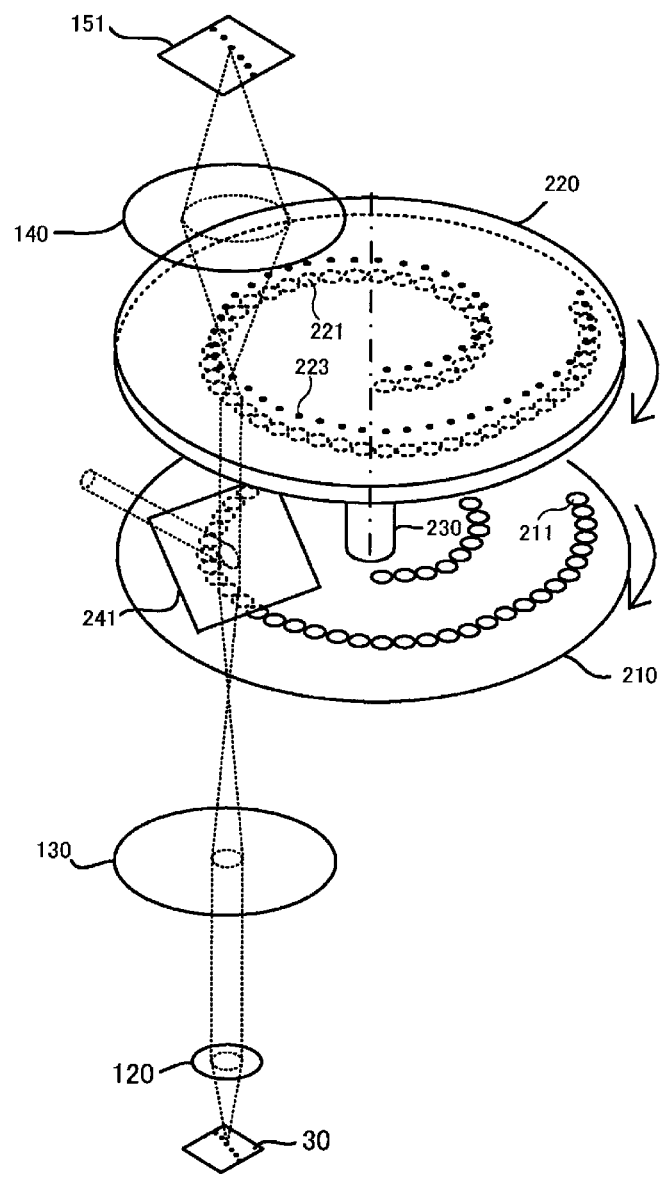
FIG. 3 pictorially shows a scanning state of the confocal microscope.

The light having passed through the pinhole 223 is imaged on the capturing element 151 of the camera 150 by the relay lens 140. The micro lens disk 210 and the pinhole disk 220 having the micro lenses are rotated by the motor 230 to scan the entire sample 30 with the illumination light, so that a confocal image of the sample 30 can be captured by the camera 150. FIG. 3 pictorially shows a scanning state. Also, it is possible to obtain a three-dimensional image by scanning the sample 30 in a z-axis direction.

Figure 4:
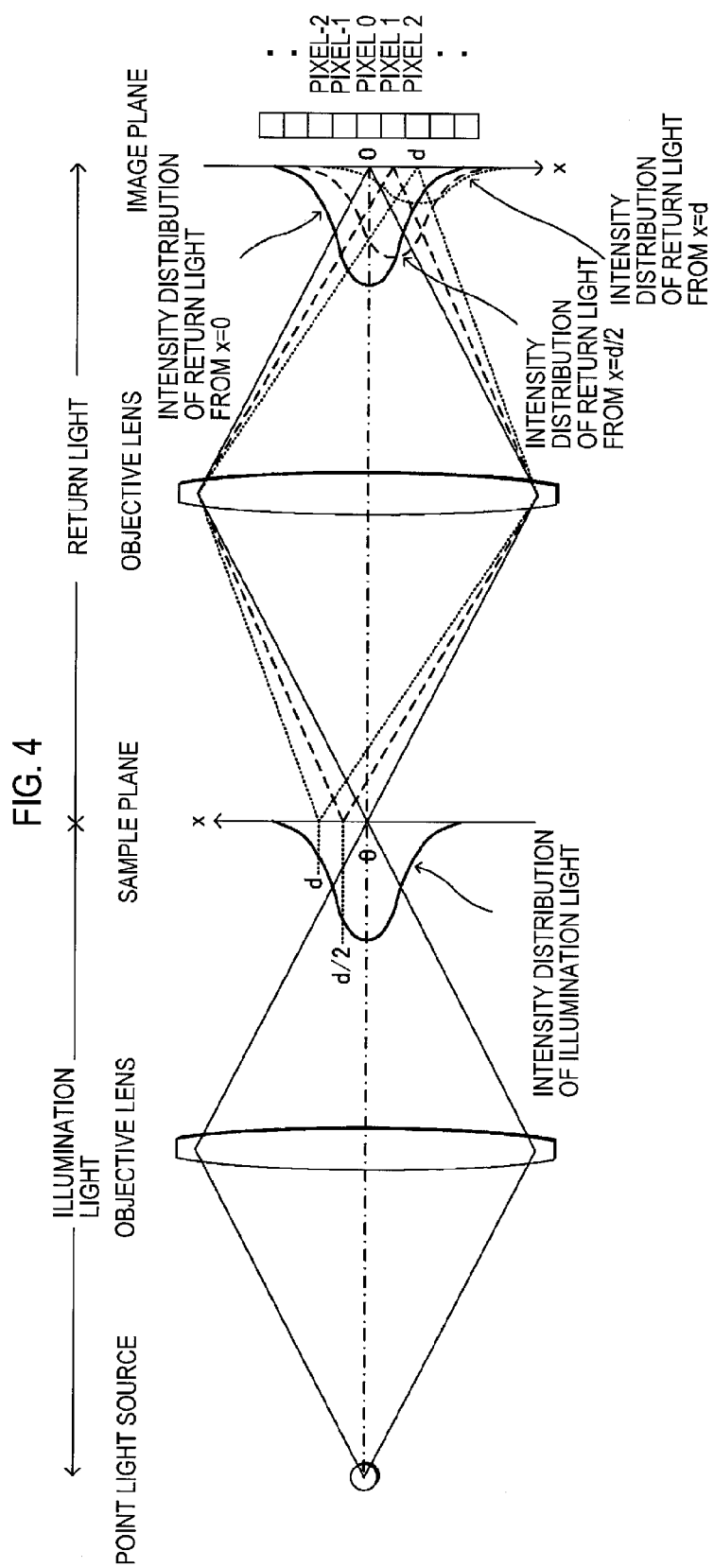
FIG. 4 pictorially shows a confocal optical system using a camera.

The reason to obtain a super resolution image by the confocal microscope 10 using the confocal scanner 20 of this exemplary embodiment is described. FIG. 4 pictorially shows a confocal optical system using a camera, which is a two-dimensional image sensor. For simplification, the illumination light-side and the return light-side are shown at left and right sides, respectively, and the illumination light-side ranges from a point light source to a sample plane and the return light-side ranges from the sample plane to an image plane. Also, the magnification of the objective lens is one time for simplification. However, such assumption does not damage the generality of the discussion. By assuming the magnification as one time, it is possible to treat the sample plane and the image plane with upside-down coordinates of equal scales.

The illumination light generated from a point light source on the optical axis is focused on a sample plane by the objective lens. At this time, an intensity distribution of the illumination light on the sample plane has a predetermined area about the coordinate 0 due to the diffraction of the light, as shown in FIG. 4. The area of the intensity distribution of the light is generally referred to as an airy disk.

Then, the return lights, which are generated at three points of coordinates 0, d/2 and d on the sample plane by the irradiation of the illumination light to the sample, are considered. It is assumed that the three points are in the airy disk of the illumination light. The intensity distribution on the image plane of the return lights generated from the coordinates 0, d/2, d on the sample plane has peaks at the coordinates 0, d/2, d on the image plane, as shown in FIG. 4. Heights of the respective peaks are proportional to the illumination light intensity at the coordinates 0, d/2, d on the sample plane.

The return light is received by the capturing element of the camera on the image plane. Here, a light receiving amount at a position (position corresponding to a pixel 2 in FIG. 4) of the coordinate d on the image plane is considered. Comparing the intensity distributions of the respective return lights, generated from the coordinates 0, d/2, d on the sample plane, at the position of the coordinate d on the image plane, the return light from the coordinate d/2 on the sample plane is highest, as shown in FIG. 4. That is, the pixel 2 at the position of the coordinate d on the sample plane most brightly receives the return light from the coordinate d/2 on the sample plane, not the return light from the coordinate d on the sample plane. This means that the light is projected with being twice enlarged from the sample plane onto the image plane in the microscopic area referred to as the airy disk.

The above can be described by equations, as follows. When a position on the sample plane at which the return light is generated is denoted as x, a light receiving amount I(x) at a position d on the image plane is expressed as follows.

$$I(x) = PSF_{ill}(x) \times PSF_{img}(x-d) \qquad \text{[equation 1]}$$

Here, $PSF_{ill}(x)$ and $PSF_{img}(x)$ indicate point image distribution functions at the illumination-side and the capturing-side. In general, the point image distribution function $PSF(x)$ is expressed using Bessel function of the first kind $J_1$, a numerical aperture NA of the optical system and a wavelength $\lambda$, as follows.

$$PSF(x) = \left( \frac{J_1(2\pi \cdot NA \cdot x/\lambda)}{\pi \cdot NA \cdot x/\lambda} \right)^2 \qquad \text{[equation 2]}$$

Figure 5:
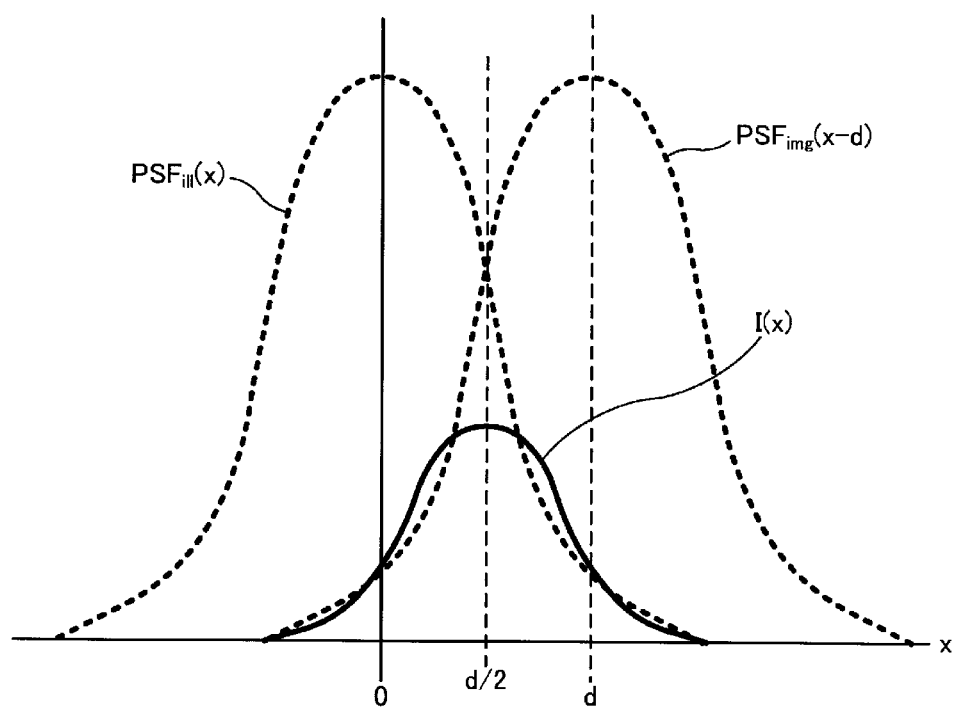
FIG. 5 shows an outline of a light receiving amount I(x).

From the equation 1, since the light receiving amount I(x) is a product of two point image distribution functions of which peak positions are different by a distance d, the light receiving amount I(x) has a peak at a position d/2, as shown in an outline of FIG. 5. That is, it can also be seen from the equation 1 that the pixel 2 at the position of the coordinate d on the sample plane most brightly receives the return light from the coordinate d/2 on the sample plane.

Like this, according to the confocal optical system using the camera, in the airy disk about each bright spot of a non-scanning confocal image, since the light is projected with being twice enlarged from the sample plane onto the image plane, it is possible to obtain a high-frequency component beyond the resolution limit of the optical system by performing correction processing of reducing the area of the airy disk to a half and matching the coordinates on the sample plane and the coordinates on the image plane. The reason is that the processing of reducing the area of the airy disk to a half corresponds to processing of making a width of the point image distribution function of the optical system to a half. As a result, it is possible to obtain a super resolution image having a resolution twice as high as the resolution limit (diffraction limit) of the optical system.

In this exemplary embodiment, the numerical aperture of the return light from the objective lens 120 is converted into the double numerical aperture by the micro lens disk 210 and the pinhole disk 220 having the micro lenses, so that the width of the point image distribution function of the optical system is reduced to a half by the optical processing. That is, the light is projected to the camera 150 with the area of the airy disk being reduced to a half.

Also, in this exemplary embodiment, since the numerical aperture is optically converted into the double numerical aperture when the return light from the objective lens 120 is projected to the camera 150, the resolution is enhanced not only in a plane (XY plane) of a captured image but also in an optical axis direction (Z-axis direction) perpendicular to the image. The reason is that the point image distribution function in the optical axis direction is expressed by an equation 3 and a width of the point image distribution function in the optical axis direction is inversely proportional to a square of the numerical aperture. Therefore, the present invention is also appropriate to the detailed observation of a three-dimensional structure of the sample.

$$PSF_{axial}(z) = \left( \frac{\sin(\pi \cdot NA^2 \cdot z/(2\lambda))}{\pi \cdot NA^2 \cdot z/(2\lambda)} \right)^2 \quad \text{[equation 3]}$$

Figure 6A:
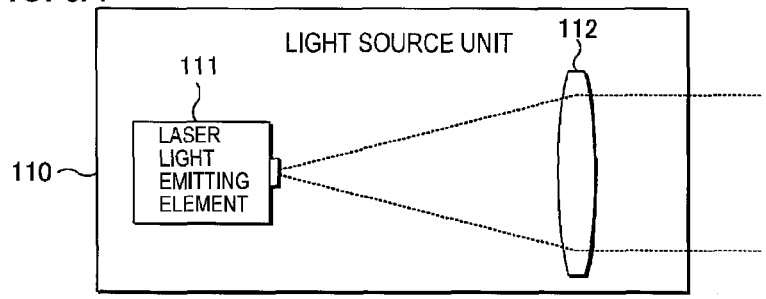
FIGS. 6A to 6D show a configuration example of a light source unit configured to emit an illumination light of a parallel light.

In the meantime, the light source unit 110 configured to emit the illumination light of the parallel light may be configured by disposing a collimate lens 112 at an appropriate place in front of a laser light emitting element 111 such as a laser diode, as shown in FIG. 6A, for example.

Figure 6B:
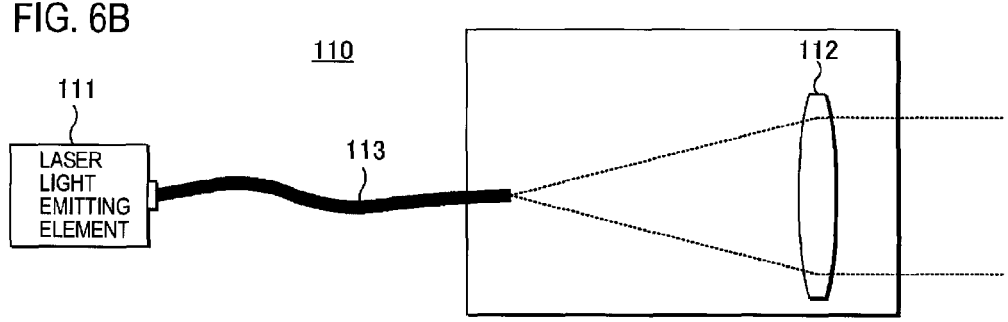

Alternatively, as shown in FIG. 6B, the laser light may be introduced to one end of a single mode fiber 113 from the laser light emitting element 111, and an emission light from the other end of the single mode fiber 113 may be collimated at the collimate lens 112. In this case, the laser light emitting element 111 may be disposed at a place distant from the confocal scanner 20.

Figure 6C:
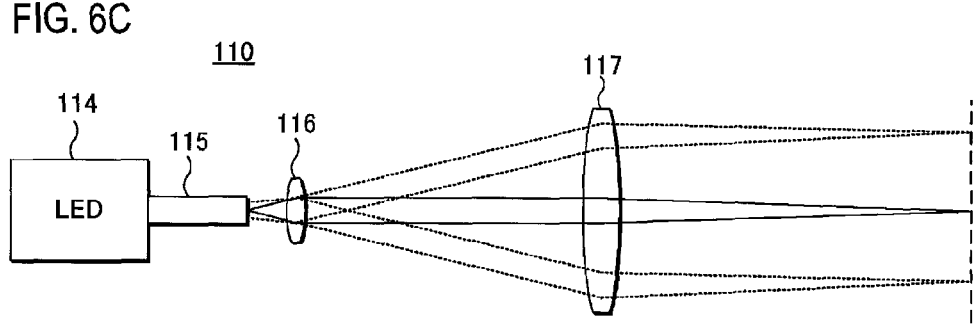

Also, as shown in FIG. 6C, the light may be made to be incident to a rod integrator 115 by using an LED 114 as the light source. The rod integrator 115 is configured to generate a uniform illumination light from an end portion by internal reflection. Then, the light is enlarged and projected by two enlargement and projection lenses 116, 117. At this time, a projection plane is matched with the micro lens disk 210. By enlarging and projecting the light, the light is substantially equivalent to the collimate light in the vicinity of the micro lens disk 210, so that it can be regarded as the parallel light. In this example, it is possible to provide the uniform illumination light by using the low-priced LED.

Figure 6D:
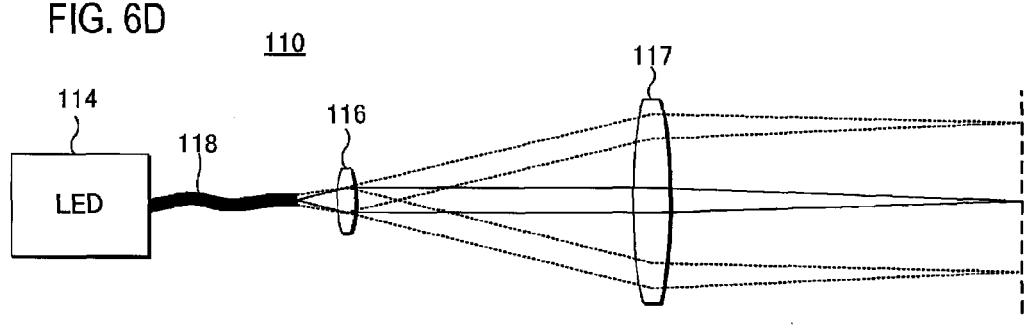

Also, as shown in FIG. 6D, a multimode fiber 118 may be used, instead of the rod integrator 115. Since the multimode fiber 118 is flexible, it is possible to dispose the LED 114 at any place.

Figure 7:
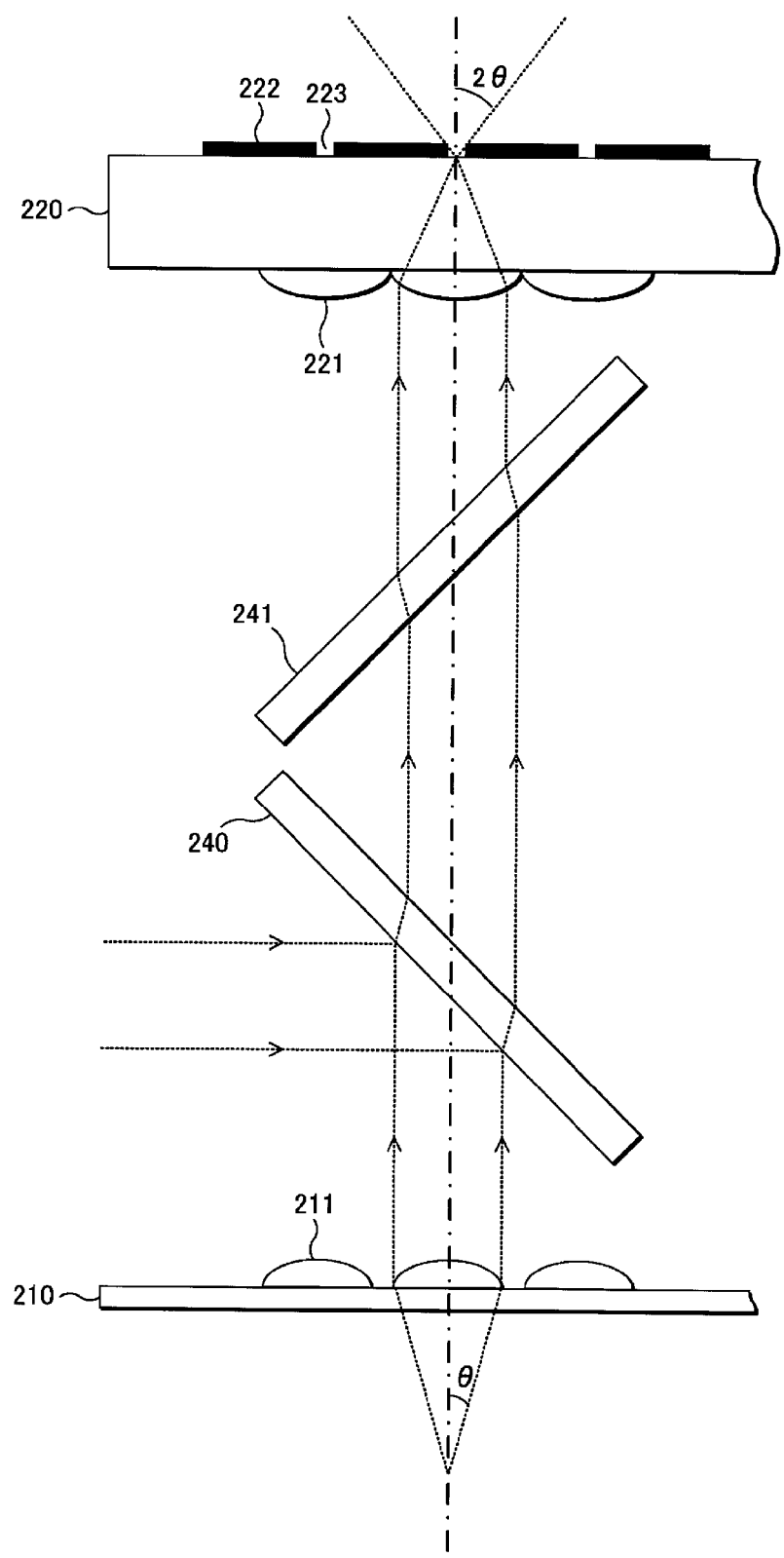
FIG. 7 shows a first modified example of the first exemplary embodiment.

In the below, modified examples of the first exemplary embodiment are described. FIG. 7 shows another example of the optical path shift correction of a first modified example. Also in the first modified example, the numerical aperture of the light that is to be concentrated by the micro lens 221 and to diverge from the pinhole 223 is set to be twice as large as the numerical aperture of the light that is to be concentrated by the micro lens 211. That is, the parameters of both the micro lenses are selected so that when an angle of the light to be concentrated at the micro lens 211 relative to the axis is denoted as θ, an angle of the light to diverge from the pinhole 223 is 2θ.

In the first modified example, the beam splitter 240 is disposed at the angle of 45° relative to the axis and the illumination light is guided to the micro lens disk 210 in parallel with the optical axes of the micro lenses 211, 221.

Above the beam splitter 240 (at a side facing the pinhole disk 220 having the micro lenses), an optical path correction glass plate 241 made of the same material as the beam splitter 240 and having the same thickness is obliquely disposed at an angle of 45° in an opposite direction to the beam splitter 240.

The return light from the sample 30 passes the same optical path as the illumination light, and passes through the beam splitter 240. At this time, although the optical path is shifted, the shifted optical path is cancelled because the light passes through the optical path correction glass plate 241, and the light is incident to the micro lens 221. Since it is not necessary to adjust the angle of the beam splitter 240, the incidence of the light can be simply implemented.

Figure 8:
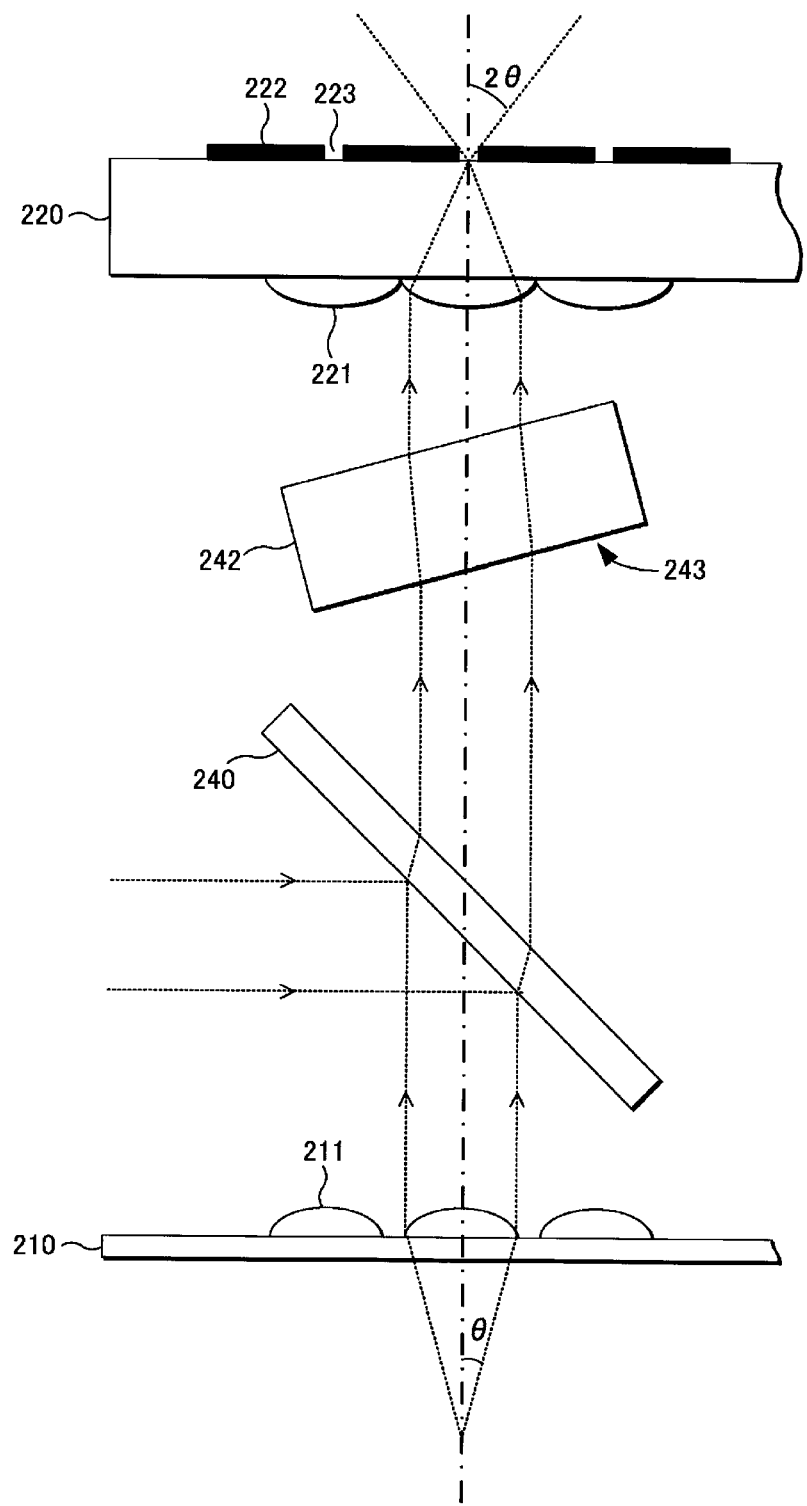
FIG. 8 shows a second modified example of the first exemplary embodiment.

FIG. 8 shows a second modified example of the first exemplary embodiment. In the second modified example, the beam splitter 240 is disposed at the angle of 45° relative to the axis, and an optical path correction filter 242 is used so as to correct the optical path shift. Since the optical path correction filter 242 is thicker than the beam splitter 240, the optical path correction filter 242 is disposed at an angle smaller than 45° relative to the micro lens disk 210.

Also, one surface of the optical path correction filter 242 is provided with a filter film 243 configured to shield the laser light and to pass only the fluorescence. Thereby, for example, when a part of the laser light is reflected on the micro lens disk 210 and passes through the beam splitter 240 and the fluorescence is radiated from the surface of the pinhole disk 220 having the micro lenses, the light shield mask 222 and the like, such a fluorescence becomes a noise if the filter film 243 is not provided. In contrast, when the optical path correction filter 242 having the filter film 243 is used, the wavelength of the laser light is interrupted from advancing towards the pinhole disk 220 having the micro lenses, so that the noise light can be excluded.

In the second modified example, it is possible to reduce a distance between the micro lens disk 210 and the pinhole disk 220 having the micro lenses, as compared to the first modified example. Therefore, it is possible to increase the stiffness of the disk unit in which the micro lens disk and the pinhole disk are connected and integrated.

Figure 9:
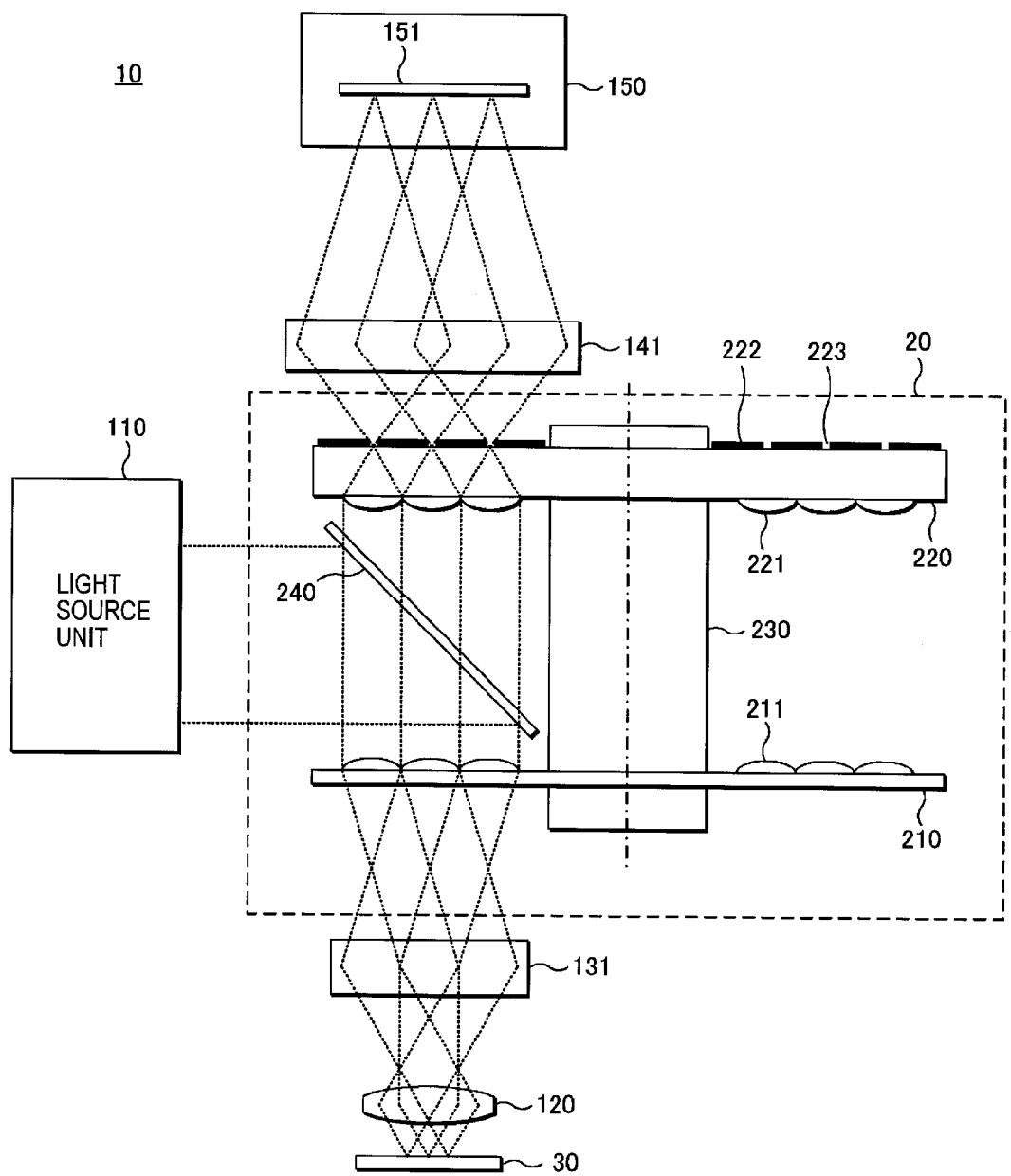
FIG. 9 shows a third modified example of the first exemplary embodiment.

A third modified example of the first exemplary embodiment is described with reference to FIG. 9. In the third modified example, an object-side variable power optical system 131 is used instead of the capturing lens 130, and a camera-side variable power optical system 141 is used instead of the relay lens 140. The objective-side variable power optical system 131 such as a zoom lens is used instead of the capturing lens 130. Thereby, even when the objective lens 120 having a different pupil diameter is used, it is possible to regulate the objective-side variable power optical system 131 so that an optimal focal length satisfying the pupil diameter is obtained.

For example, in case of the high-power objective lens 120 having a small pupil diameter, the focal length of the objective-side variable power optical system 131 is shortened so that the light emitted from the micro lens disk 210 satisfies the pupil diameter of the objective lens 120. In case of the low-power objective lens 120 having a large pupil diameter, the focal length of the objective-side variable power optical system 131 is lengthened so that the light emitted from the micro lens disk 210 satisfies the pupil diameter of the objective lens 120.

The magnification of the microscope is generally determined by a ratio of the focal lengths of the objective lens 120 and the objective-side variable power optical system 131 (capturing lens 130). Therefore, when the focal length of the objective-side variable power optical system 131 is changed, the magnification is also changed. This is corrected by the camera-side variable power optical system 141.

For example, when the focal length of the objective-side variable power optical system 131 is lengthened to a double value of the normal focal length of the capturing lens 130 so as to cope with the low-power objective lens 120, an image having a double size of a usual size can be obtained on the surface of the pinhole disk 220 having the micro lenses. For example, when a 10× (ten times) objective lens is used, an image equivalent to a twenty times size is obtained. In contrast, the camera-side variable power optical system 141 is configured to project the image on the surface of the pinhole disk 220 having the micro lenses to the capturing element 151 of the camera 150 so that a size thereof becomes a half. Thereby, an image having the same size as usual is obtained.

In order to achieve the above configurations, a capturable range should be wider than the related art. However, in the exemplary embodiment, since the light between the micro lens disk 210 and the pinhole disk 220 having the micro lenses is the parallel light, it is possible to easily wide the distance therebetween, so that the above configurations can be simply implemented. Also, since it is possible to guide the optimal light to the pupil diameter of the objective lens 120, the resolution increases and the using efficiency of the light is also improved. That is, in case of a low-power optical system, a situation where only a part of the light is used in the high-power objective lens 120 having a small pupil diameter does not occur. That is, the efficiency is high.

Second Exemplary Embodiment

Figure 10:
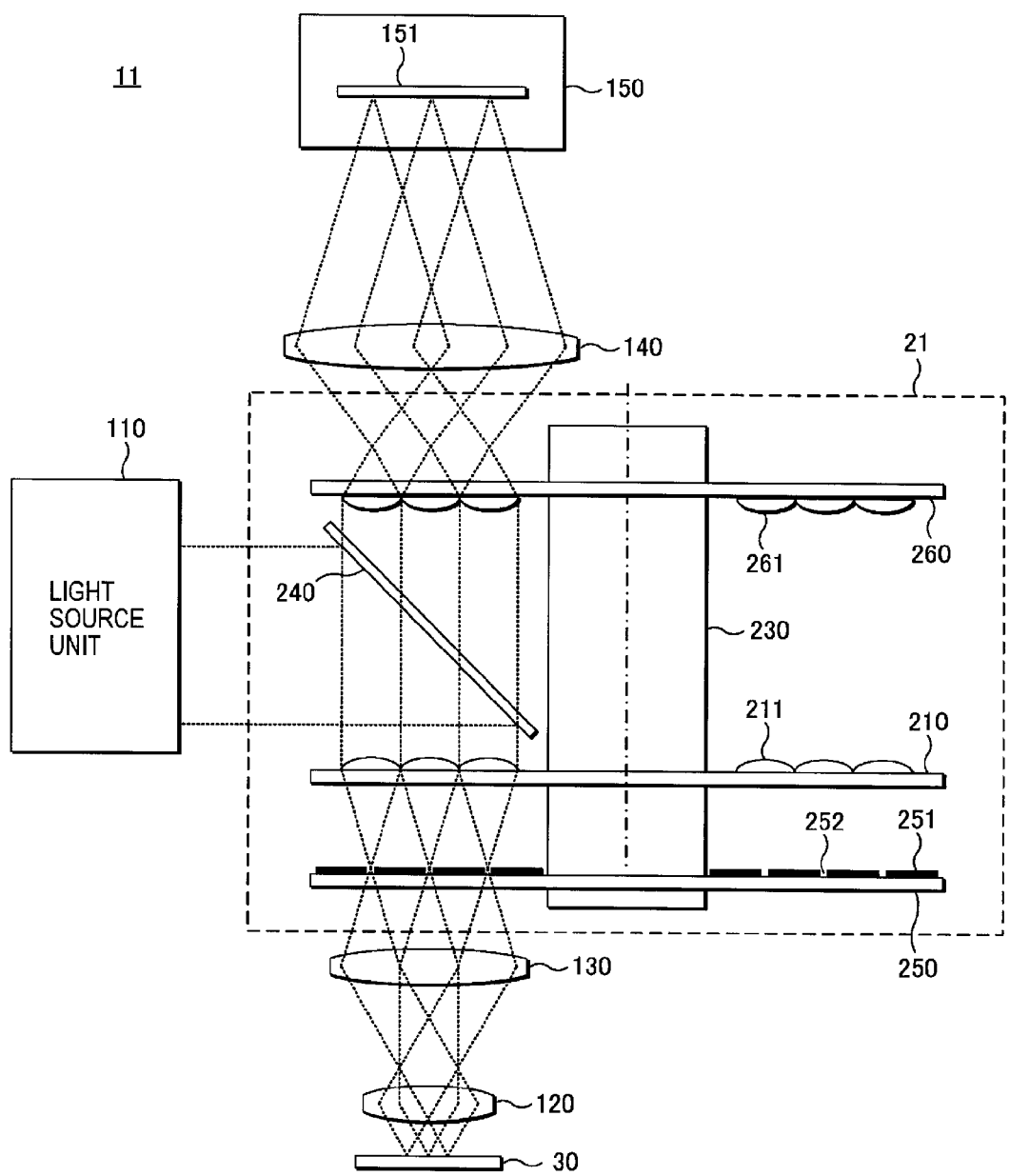
FIG. 10 pictorially shows a configuration of the confocal microscope using a confocal scanner of a second exemplary embodiment.

In the below, a second exemplary embodiment of the present invention is described. FIG. 10 pictorially shows a configuration of a confocal microscope 11 using a confocal scanner 21 of the second exemplary embodiment. The same parts as the first exemplary embodiment are denoted by the same reference numerals. The light source unit 110, the objective lens 120, the capturing lens 130, the relay lens 140 and the camera 150 are the same as the first exemplary embodiment.

The confocal scanner 21 includes the micro lens disk 210 having the plurality of micro lenses 211 regularly arranged thereon, a second micro lens disk 260 having a plurality of micro lenses 261 regularly arranged thereon, a pinhole disk 250 having a plurality of pinholes 252 regularly formed by fine apertures of a light shield mask 251, the motor 230 and the beam splitter 240. The pinhole disk 250, the micro lens disk 210 and the second micro lens disk 260 are arranged so that central axes thereof overlap with each other, and are configured to integrally rotate about the central axes by the motor 230.

The pinhole disk 250 and the micro lens disk 210 are arranged from a side closer to the objective lens 120, and the second micro lens disk 260 is arranged with the beam splitter 240 being interposed therebetween. The respective pinholes 252 of the pinhole disk 250, the respective micro lenses 211 of the micro lens disk 210 and the respective micro lenses 261 of the second micro lens disk 260 are coaxially arranged.

That is, in the second exemplary embodiment, the pinhole 252 is arranged at the objective lens 120-side, so that not only the return light but also the illumination light passes through the pinhole 252. Since the return light from the focusing plane by the light having passed through the pinhole 252 returns to the pinhole 252, it is possible to adjust the optical system more easily.

A distance between the micro lens disk 210 and the pinhole disk 250 is a focal length of the micro lens 211. In the meantime, the pinhole disk 250 and the micro lens disk 210 may be integrated, like the first exemplary embodiment.

Figure 11:
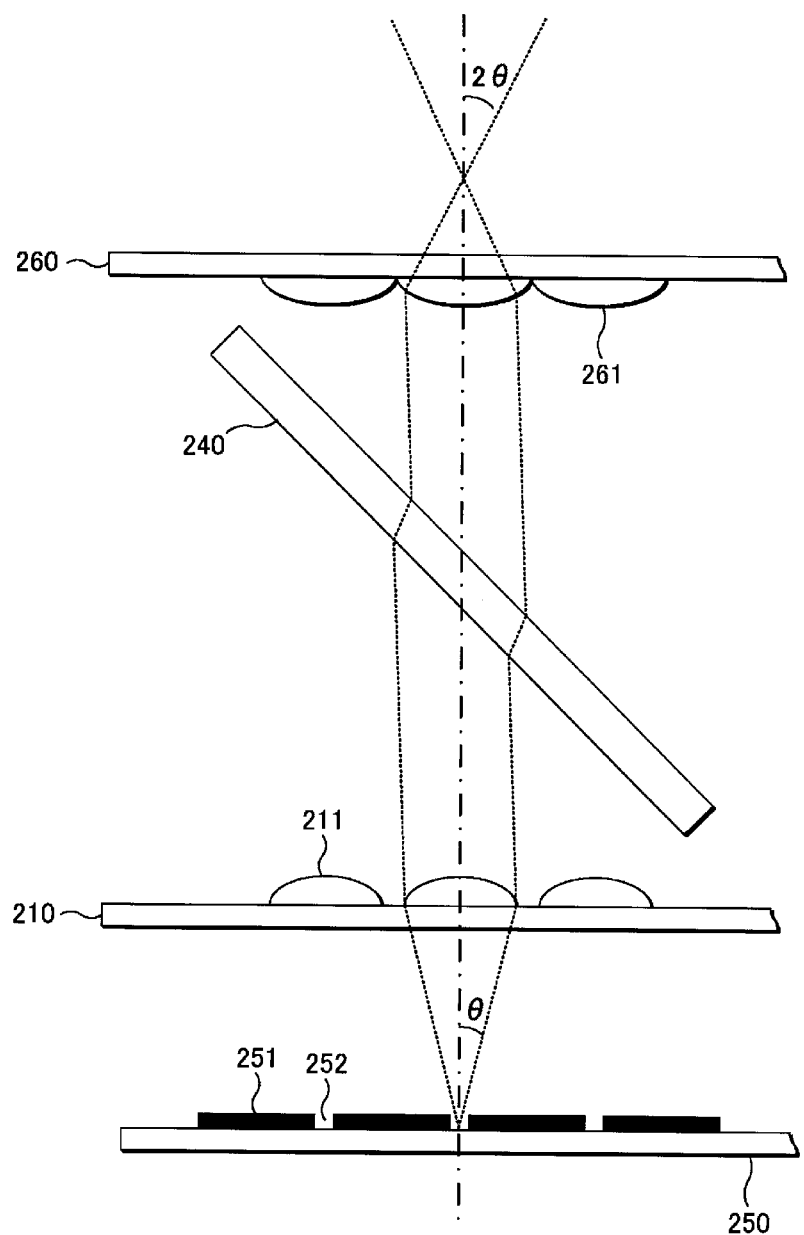
FIG. 11 shows in detail a positional relation among the pinhole disk, the micro lens disk, a second micro lens disk and the beam splitter.

FIG. 11 shows in detail a positional relation of the pinhole disk 250, the micro lens disk 210, the second micro lens disk 260 and the beam splitter 240 of the second exemplary embodiment. In FIG. 11, the central axes of the pinhole 252, the micro lens 211 and the micro lens 261 of one set arranged on the same axis are denoted by the dashed-dotted line.

Since the beam splitter 240 has a thickness of a predetermined level, an optical path of the obliquely incident light is shifted by the refraction. Also in the second exemplary embodiment, in order to correct the optical path shift, an angle of the beam splitter 240 relative to the micro lens disk 210 is set to be slightly smaller than 45°. For this reason, the light reflected on the beam splitter 240 faces towards the micro lens disk 210 at a slight angle relative to the shown dashed-dotted line.

The light from the micro lens 211 also faces towards the beam splitter 240 along an optical path of a reverse direction of the same angle, and the beam splitter 240 is disposed at an angle at which the light refracted at the beam splitter 240 is correctly incident to the micro lens 261.

In the second exemplary embodiment, a numerical aperture (NA) of the light that is to be concentrated by the micro lens 261 is set to be twice as large as a numerical aperture of the light that is to be concentrated by the micro lens 211. That is, parameters of both the micro lenses are selected so that when an angle of the light to be concentrated at the micro lens 211 is denoted as θ, an angle of the light to be concentrated at the micro lens 261 is 2θ. In the meantime, the resolution is highest at the double numerical aperture, in principle. However, the other multiples are also possible.

In the second exemplary embodiment, the capturing element 151 may be directly arranged at a focal position of the micro lens 261. In this case, since it is possible to omit the optical system such as the relay lens 140, the configuration is simpler.

Subsequently, modified examples of the second exemplary embodiment are described. Also in the second exemplary embodiment, like the first modified example of the first exemplary embodiment shown in FIG. 7, the beam splitter 240 is disposed at an angle of 45° relative to the axis, the illumination light is guided to the micro lens disk 210 in parallel with the optical axes of the micro lenses 211, 261, and the optical path correction glass plate made of the same material as the beam splitter 240 and having the same thickness is obliquely disposed at an angle of 45° in an opposite direction to the beam splitter 240 above the beam splitter 240 so as to correct the optical path.

Figure 12:
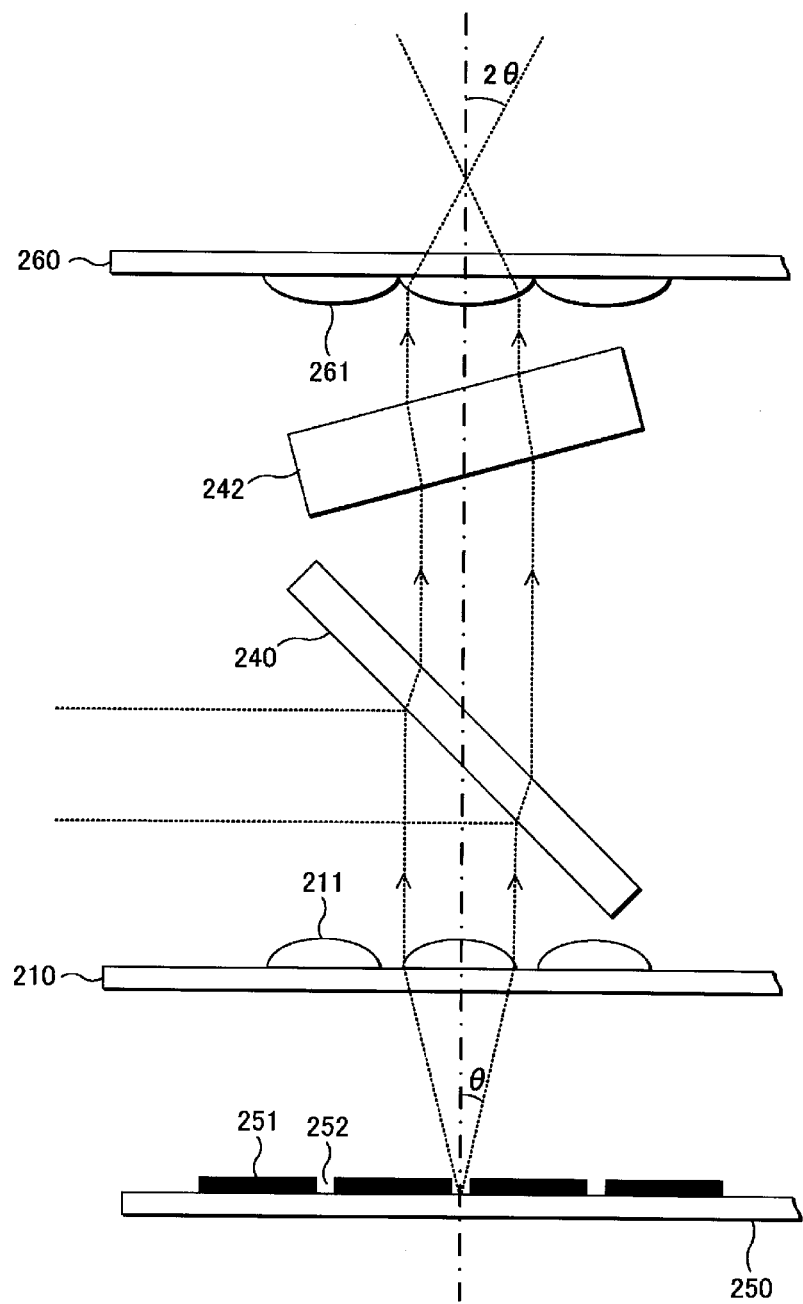
FIG. 12 shows a second modified example of the second exemplary embodiment.

A second modified example of the second exemplary embodiment is described with reference to FIG. 12. In the second modified example of the second exemplary embodiment, the beam splitter 240 is disposed at an angle of 45° relative to the axis, and the optical path correction filter 242 is used so as to correct the optical path shift. Since the optical path correction filter 242 is thicker than the beam splitter 240, the optical path correction filter 242 is disposed at an angle smaller than 45° relative to the micro lens disk 210. At this time, a filter film configured to shield the laser light and to pass only the fluorescence may be disposed on one surface of the optical path correction filter 242. In this embodiment, the micro lens 261 is disposed on the surface of the micro lens disk 260 facing the beam splitter 240. However, the micro lens 261 may be disposed on the opposite surface.

Figure 13:
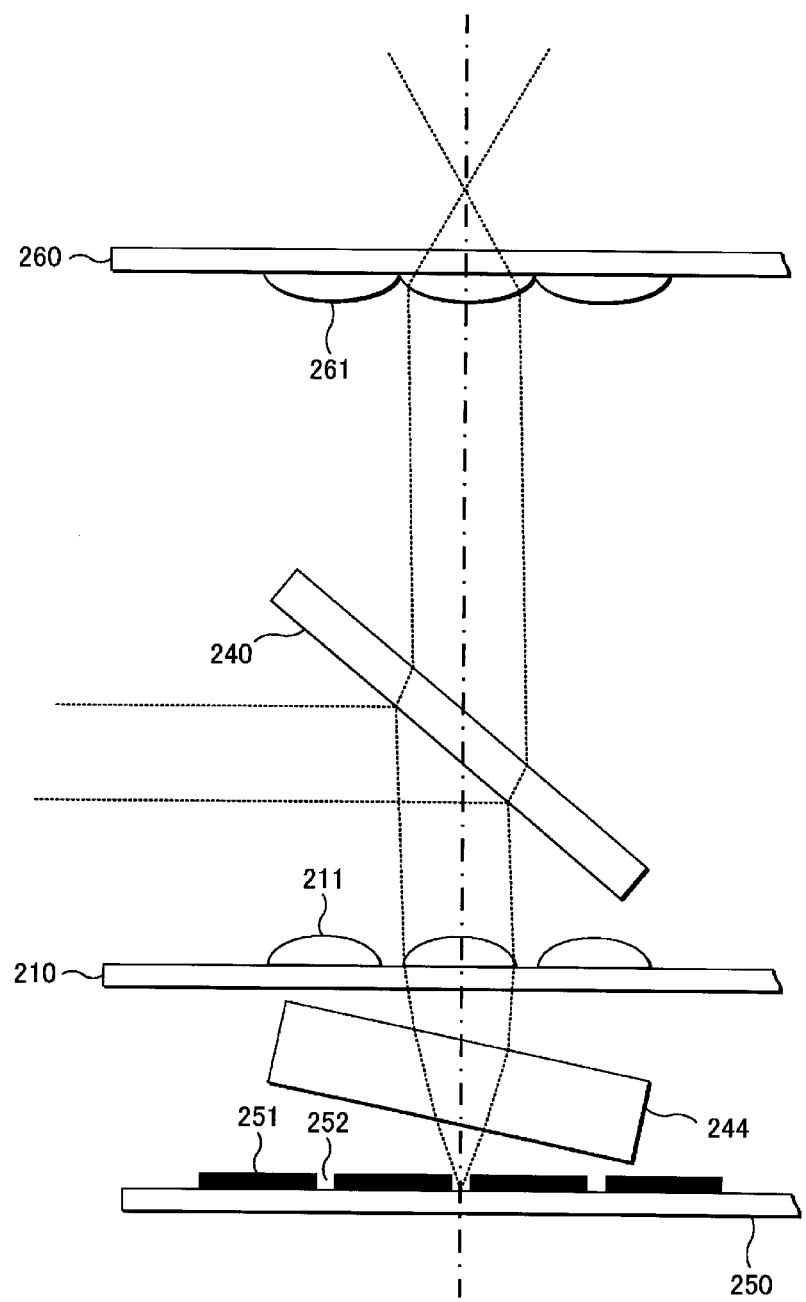
FIG. 13 shows a third modified example of the second exemplary embodiment.

A third modified example of the second exemplary embodiment is described with reference to FIG. 13. In the third modified example of the second exemplary embodiment, the optical path shift is corrected with the beam splitter 240 being disposed at an angle smaller than 45° relative to the micro lens disk 210, and an optical path correction glass plate 244 is disposed between the micro lens disk 210 and the pinhole disk 250. In the second exemplary embodiment, a distance between the micro lens 211 and the pinhole and 252, i.e., a focal length of the micro lens 221 (the second exemplary embodiment) is generally longer than the distance between the micro lens 221 and the pinhole 223 in the first exemplary embodiment, i.e., the focal length of the micro lens 221 (the first exemplary embodiment). Therefore, it is preferably to correct the inclination of the optical axis accompanied by the correction of the optical path shift. To this end, the optical path correction glass plate 244 is obliquely disposed between the micro lens disk 210 and the pinhole disk 250, thereby correcting the inclination of the optical axis.

<Improved Versions>

According to the confocal microscope 10 shown in FIG. 1 and the confocal microscope 11 shown in FIG. 10, two convex lenses and one pinhole are disposed in the direction of the rotation axis of the disks configured to integrally rotate. For this reason, the point image of the sample 30 passes through the convex lenses one more time and reaches the capturing element 151, as compared to a Nipkow disk type having a general micro lens array in which one convex lens and one pinhole are disposed.

Figure 14A:
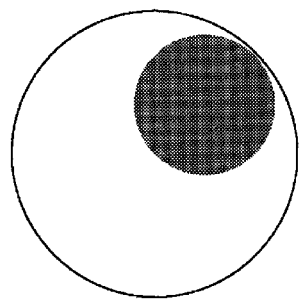
FIGS. 14A to 14C show an inverted image.
Figure 14B:
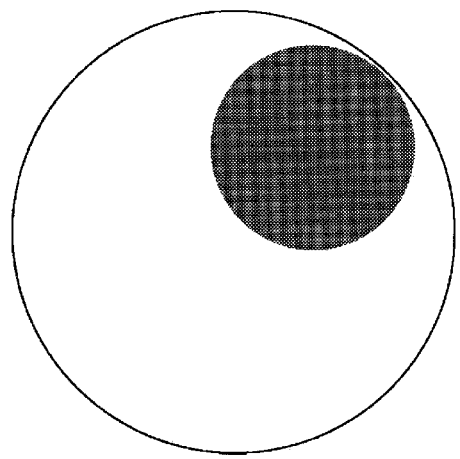
Figure 14C:
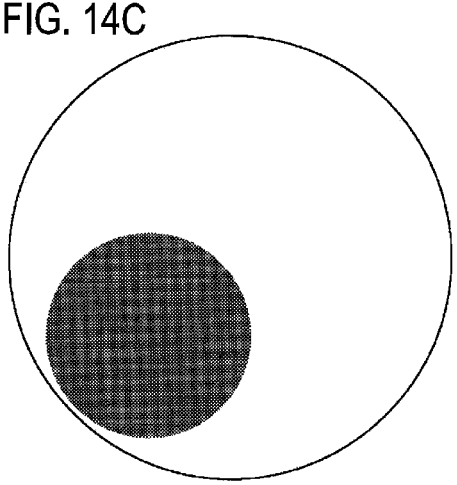

Therefore, when a point image of the sample 30 radiating the fluorescence at a right-upper area as shown in FIG. 14A is captured, a point image of an upright image as shown in FIG. 14B is obtained in a confocal microscope of a Nipkow disk type having a general micro lens array but a point image of an inverted image as shown in FIG. 14C is obtained in the confocal microscope 11 of the second exemplary embodiment.

Figure 15A:
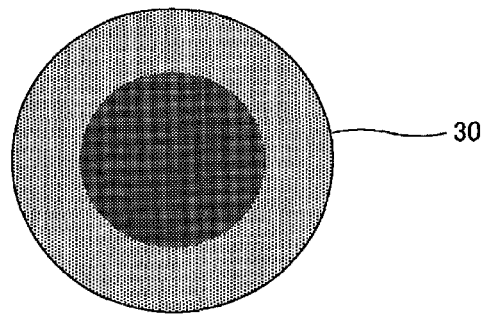
FIGS. 15A to 15C show adjacent inverted point images.
Figure 15B:
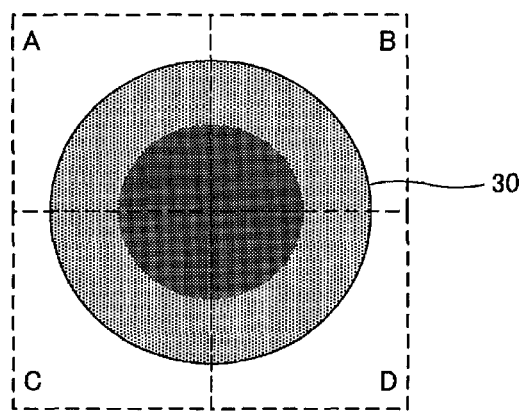

Here, a case where the sample 30 radiating the circular fluorescence as shown in FIG. 15A is imaged by scanning four areas as shown in FIG. 15B as point images (shown with rectangular images for descriptive purposes) is assumed. It is assumed that the point images are captured with the same frames by irradiating the separate illumination light beamlets. At this time, the shown example is simplified for simple descriptions.

Figure 15C:
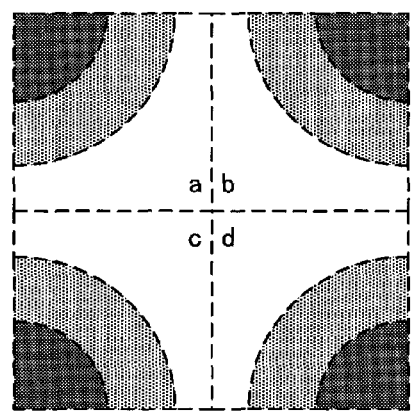

According to the confocal microscope 11 of the second exemplary embodiment, since each point image is captured as an inverted image, an image in which the point images of the respective areas are inverted is obtained as shown in FIG. 15C, and the fine continuity between the adjacent point images is damaged. For this reason, there is room for further improvement from a standpoint of the resolution.

Therefore, it is considered to return the inverted image to the upright image by enabling the light to additionally pass through the convex lens one more time in the disks configured to integrally rotate. Thereby, since the fine continuity between the adjacent point images is maintained, it is possible to further improve the resolution.

Figure 16:
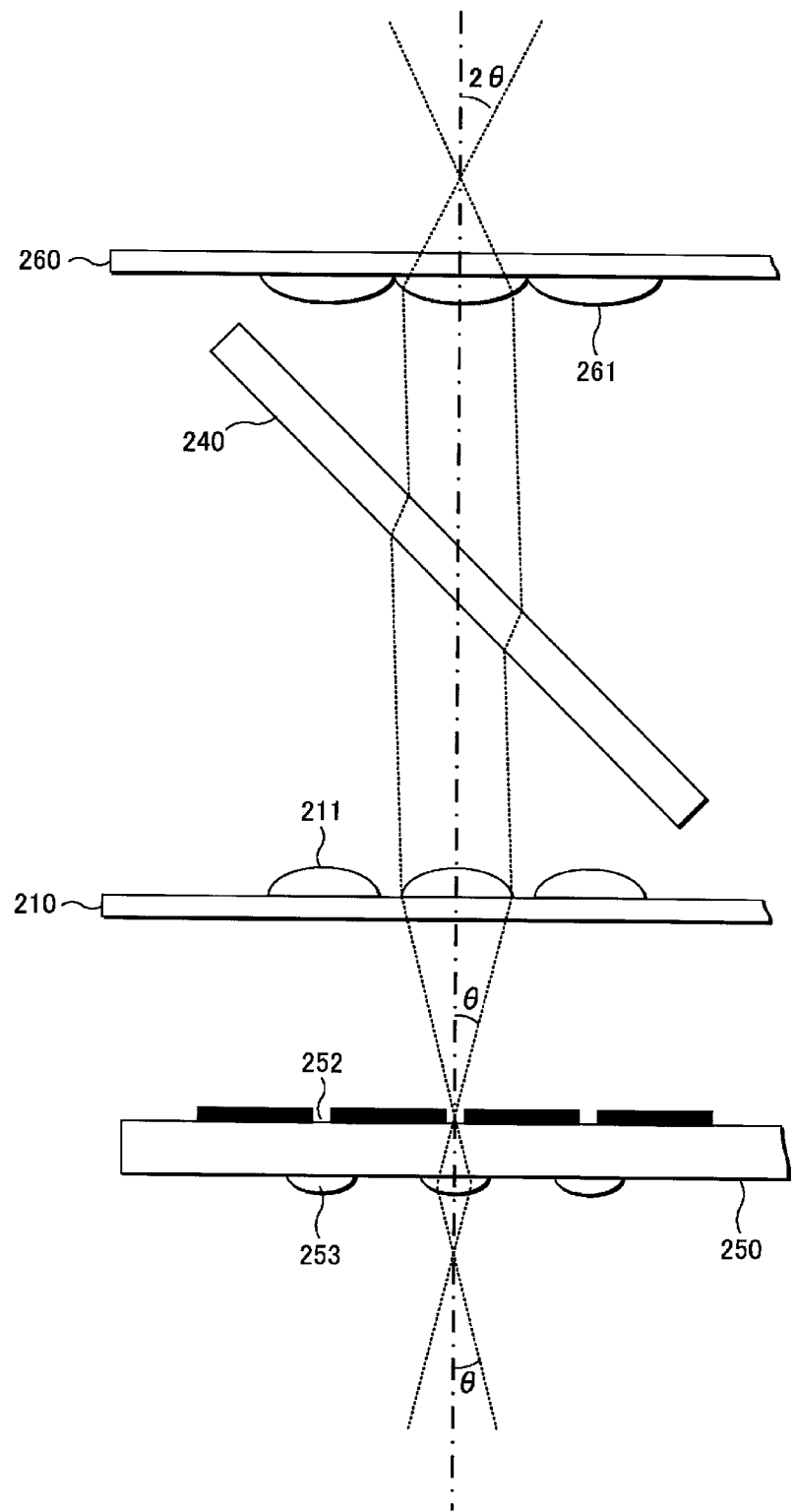
FIG. 16 shows an improved version corresponding to the second exemplary embodiment.

FIG. 16 shows in detail a positional relation among the pinhole disk 250, the micro lens disk 210, the second micro lens disk 260 and the beam splitter 240 in an improved version corresponding to the second exemplary embodiment shown in FIG. 10.

In the improved version, micro lenses 253 are disposed on an opposite surface of the pinhole disk 250 to the surface on which the pinholes are formed, in correspondence to the respective pinholes 252, so as to return the inverted image to the upright image. In FIG. 16, the central axes of the micro lens 253, the pinhole 252, the micro lens 211 and the micro lens 261 of one set disposed on the same axis are denoted by the dashed-dotted line.

The illumination light emitted from the light source 110 (FIG. 10) is reflected on the beam splitter 240, passes through the micro lens 211 and is divided into a plurality of illumination light beamlets. The respective illumination light beamlets are concentrated in the pinhole 252, and are incident to the micro lens 253 with being slightly widened in the thickness direction of the pinhole disk 250. Then, the beamlets are again concentrated at the micro lens 253, are widened, are incident to the capturing lens (refer to FIG. 10), and are concentrated on the sample 130 by the objective lens 120 (refer to FIG. 10).

In the improved version, the concentration angle of light in the pinhole 252 and the concentration angle of light at the micro lens 253 (the widened angle after the concentration of light) are designed to be θ.

The return light from the sample 30 passes through the objective lens 120 (refer to FIG. 10), the capturing lens (refer to FIG. 10), the micro lens 253, the pinhole 252 and the micro lens 211 in corresponding order along the same optical path as the illumination light, becomes the parallel light, passes through the beam splitter 240 and are incident to the micro lens 261. Then, the return light is concentrated at the angle of 2θ.

An area of the micro lens 253-side of the pinhole disk 250 except for the micro lenses 253 may be subject to the light shield processing. Thereby, it is possible to prevent the light, which returns at an angle greater than θ, from being incident to the surrounding micro lenses 253 to deteriorate an image.

Like the first modified example of the second exemplary embodiment, the beam splitter 240 may be disposed at the angle of 45° relative to the axis, and the optical path correction glass plate may be obliquely disposed at the angle of 45° in the opposite direction so as to correct the optical path correction. Like the second modified example, the optical path correction filter 242 may be used so as to correct the optical path shift. Like the third modified example, the beam splitter 240 may be disposed at an angle smaller than 45° relative to the micro lens disk 210, and the optical path correction glass plate 244 may be disposed.

Figure 17:
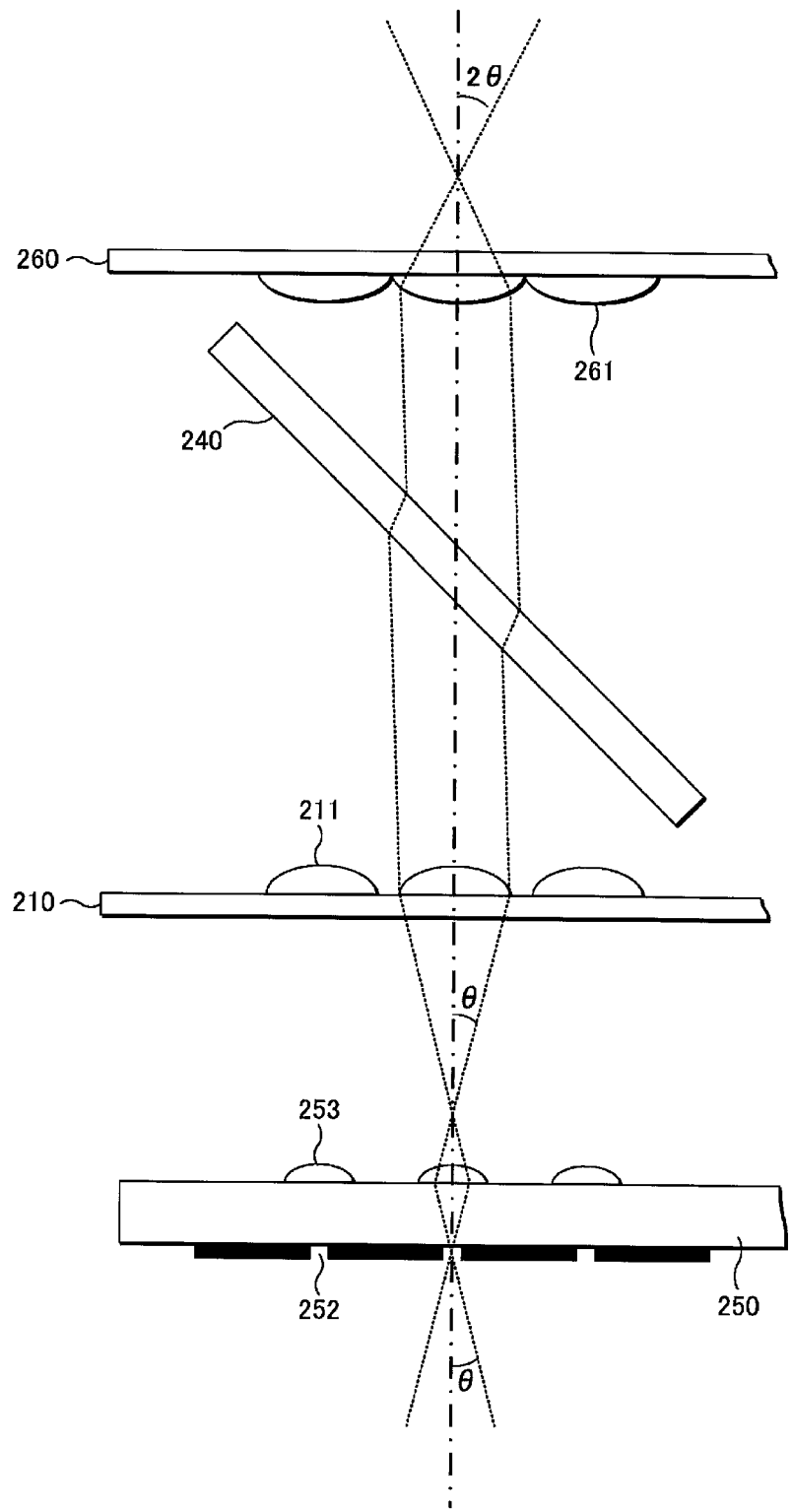
FIG. 17 shows another example of an improved version corresponding to the second exemplary embodiment.

Also, as shown in FIG. 17, regarding the pinhole disk 250 having the micro lenses 253 arranged thereon, the pinhole surface may be made to face towards the sample 30. In this case, a distance between the micro lens 211 and the micro lens 253 is set to be longer than the focal length of the micro lens 211, and each illumination light beamlet is concentrated in front of the micro lens 253 and is incident to the micro lens 253 with being slightly widened. Each beamlet advances in the pinhole disk 250, is concentrated in the pinhole 252, is widened, is incident to the capturing lens (refer to FIG. 10), and is concentrated on the sample 30 by the objective lens 120 (refer to FIG. 10).

In this example, the incident angle of light to the micro lens 253 and the emission angle of light from the pinhole 252 are designed to be θ.

The return light from the sample 30 passes through the objective lens 120 (refer to FIG. 10), the capturing lens (refer to FIG. 10), the pinhole 252, the micro lens 253, and the micro lens 211 in corresponding order along the same optical path as the illumination light, becomes the parallel light, passes through the beam splitter 240 and are incident to the micro lens 261. Then, the return light is concentrated at the angle of 2θ.

Figure 18:
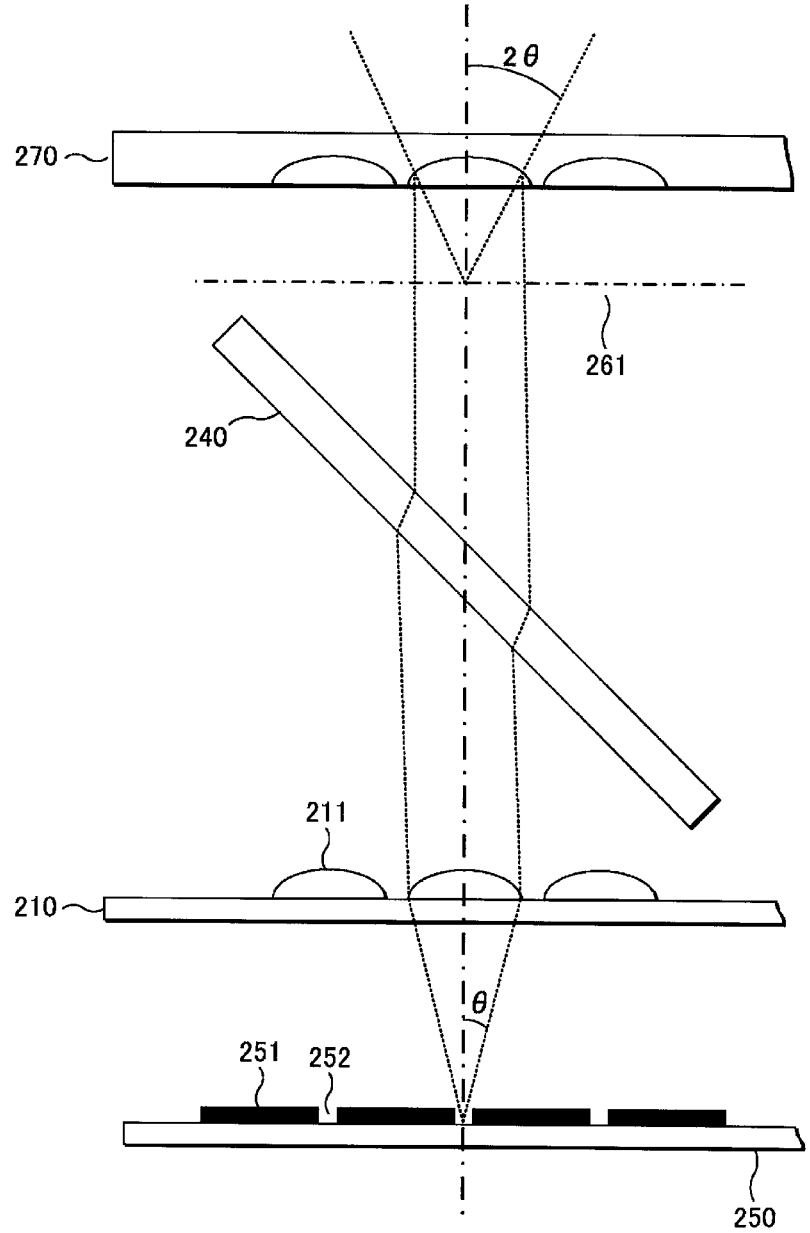
FIG. 18 shows still another example of an improved version corresponding to the second exemplary embodiment.
Figure 19:
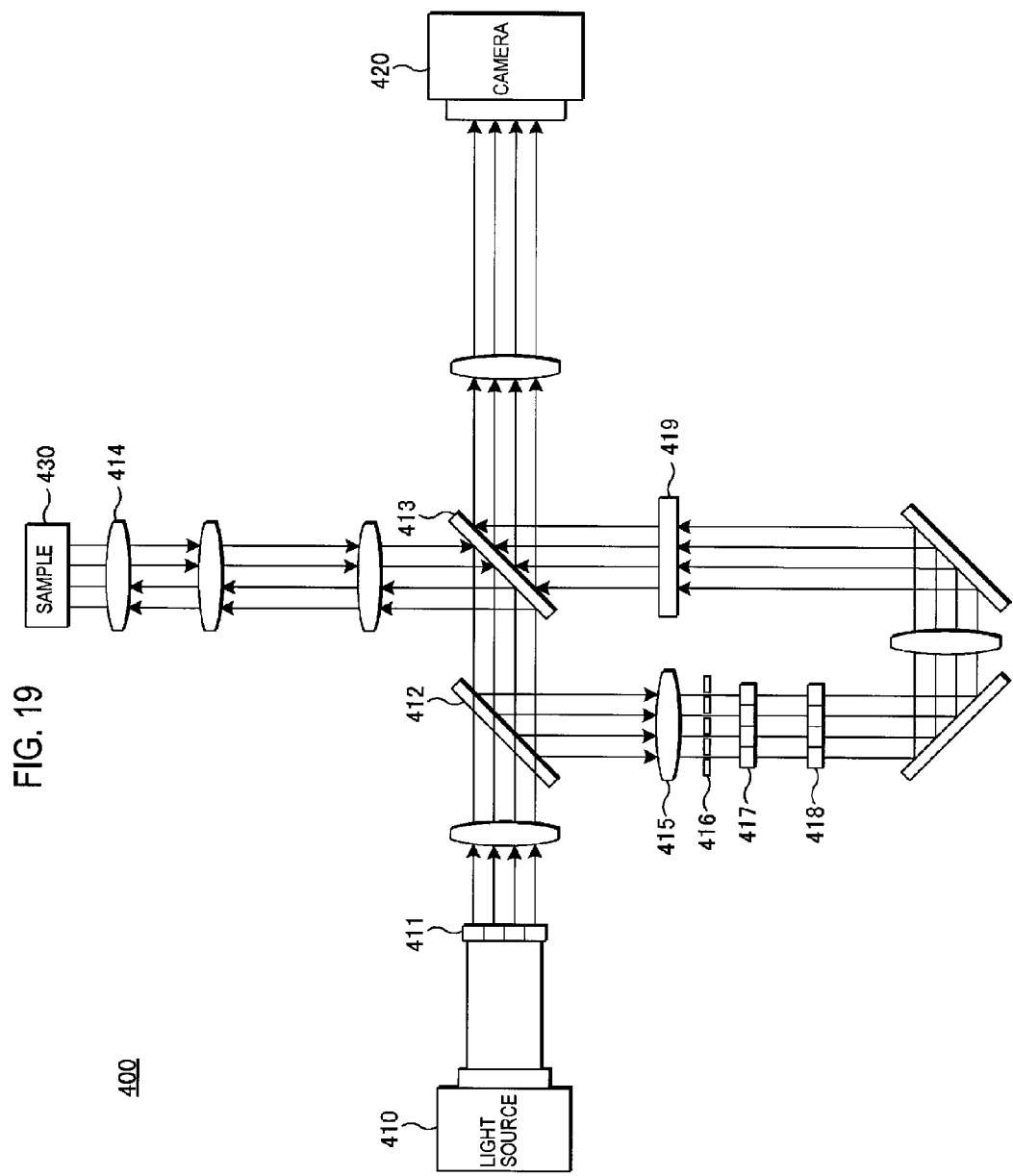
FIG. 19 shows a configuration of an optical system of a microscope system configured to obtain a super resolution image with optical processing according to the related art.

Alternatively, as shown in FIG. 18, the pinhole disk 250 may not be provided with the micro lenses, and a micro concave lens disk 270 may be used instead of the second micro lens disk 260. In this case, instead of the configuration of returning the inverted image to the upright image by enabling the light to additionally pass through the convex lens one more time, the point image is prevented from being the inverted image by reducing the number of passing times of the light through the convex lens.

The micro concave lens disk 270 adopts the convex lenses formed on the second micro lens disk 260, as concave lenses. Each concave lens is designed to radiate the return light of the parallel light at the angle of 2θ. A line 261 in FIG. 18 indicates a focal plane of the concave lenses.

In this example, the relay lens 140 (refer to FIG. 10) is configured to project an image of the focal plane 261 onto the surface of the capturing element (refer to FIG. 10) of the camera 150. The configuration of this example has merits that each point image is an upright image and the configuration is further simpler.

What is claimed is:

1. A confocal scanner comprising:
    a first micro lens disk having a plurality of micro lenses arranged thereon;
    a second micro lens disk having a plurality of micro lenses, which is arranged in correspondence to an arrangement pattern of the first micro lens disk, and having a common rotation axis to the first micro lens disk;
    a third micro lens disk having a plurality of micro lenses for image reversal arranged on one surface thereof and a plurality of pinholes arranged on an other surface thereof, the plurality of micro lenses and the plurality of pinholes being arranged in correspondence with an arrangement pattern of the first micro lens disk, the third micro lens disk having the common rotation axis of the first micro lens disk and being provided on an opposite side to the second micro lens disk with respect to the first micro lens disk; and
    a beam splitter configured to guide an illumination light, which is to be irradiated to an object, to the first micro lens disk, and to guide a return light from the object having passed through each micro lens of the first micro lens disk to the corresponding micro lens of the second micro lens disk,
    wherein a numerical aperture of each micro lens arranged on the second micro lens disk is greater than a numerical aperture of each micro lens arranged on the first micro lens disk.

2. The confocal scanner according to claim 1, wherein pinholes are arranged at respective focal positions of the respective micro lenses, which are arranged on the second micro lens disk, on a side opposite to the object.

3. The confocal scanner according to claim 1, wherein the pinholes are arranged at respective focal positions of the respective micro lenses, which are arranged on the first micro lens disk, on a side facing the object.

4. The confocal scanner according to claim 1, wherein the micro lenses arranged on the second micro lens disk are concave lenses.

5. The confocal scanner according to claim 1, wherein the numerical aperture of each micro lens arranged on the second micro lens disk is substantially twice as large as the numerical aperture of each micro lens arranged on the first micro lens disk.

6. The confocal scanner according to claim 1, wherein the illumination light that is to be guided to the first micro lens disk by the beam splitter advances in parallel with an optical axis of each micro lens on the first micro lens disk, and
    wherein the confocal scanner comprises:
    an optical member configured to correct an optical path shift, which is caused due to the beam splitter, and disposed between the first micro lens disk and the second micro lens disk.

7. A confocal microscope comprising:
    the confocal scanner according to claim 1;
    a light source unit configured to emit an illumination light of a parallel light to the beam splitter;
    an objective lens disposed at a first micro lens disk-side; and
    a capturing element arranged at a second micro lens disk-side.

8. The confocal microscope according to claim 7, comprises:
    a first variable power optical system disposed between the first micro lens disk and the objective lens; and
    a second variable power optical system disposed between the second micro lens disk and the capturing element.

9. A confocal scanner comprising:
    a first micro lens disk having a plurality of micro lenses arranged thereon;
    a second micro lens disk having a plurality of micro lenses, which is arranged in correspondence to an arrangement pattern of the first micro lens disk, and having a common rotation axis to the first micro lens disk; and
    a beam splitter configured to guide an illumination light, which is to be irradiated to an object, to the first micro lens disk, and to guide a return light from the object having passed through each micro lens of the first micro lens disk to the corresponding micro lens of the second micro lens disk,
    wherein a numerical aperture of each micro lens arranged on the second micro lens disk is greater than a numerical aperture of each micro lens arranged on the first micro lens disk, wherein micro lenses for image reversal are arranged at more distant positions than respective focal positions of the respective micro lenses, which are arranged on the first micro lens disk, on a side of the first micro lens disk facing the object, and pinholes are arranged at each focusing position of the illumination lights of the micro lenses for image reversal.

10. A confocal scanner comprising:
a first micro lens disk having a plurality of micro lenses arranged thereon;
a second micro lens disk having a plurality of micro lenses, which is arranged in correspondence to an arrangement pattern of the first micro lens disk, and having a common rotation axis to the first micro lens disk; and
a beam splitter configured to guide an illumination light, which is to be irradiated to an object, to the first micro lens disk, and to guide a return light from the object having passed through each micro lens of the first micro lens disk to the corresponding micro lens of the second micro lens disk,
wherein a numerical aperture of each micro lens arranged on the second micro lens disk is greater than a numerical aperture of each micro lens arranged on the first micro lens disk,
wherein a diameter of each micro lens arranged on the first micro lens disk is smaller than a diameter of each micro lens arranged on the second micro lens disk.

11. A confocal scanner comprising:
a first micro lens disk having a plurality of micro lenses arranged thereon;
a second micro lens disk having a plurality of micro lenses, which is arranged in correspondence to an arrangement pattern of the first micro lens disk, and having a common rotation axis to the first micro lens disk; and
a beam splitter configured to guide an illumination light, which is to be irradiated to an object, to the first micro lens disk, and to guide a return light from the object having passed through each micro lens of the first micro lens disk to the corresponding micro lens of the second micro lens disk,
wherein a numerical aperture of each micro lens arranged on the second micro lens disk is greater than a numerical aperture of each micro lens arranged on the first micro lens disk,
wherein a diameter of each micro lens arranged on the first micro lens disk is smaller than a diameter of each micro lens arranged on the second micro lens disk,
wherein the illumination light that is to be guided to the first micro lens disk by the beam splitter obliquely advances relative to an optical axis of each micro lens on the first micro lens disk.

* * * * *